US012746470B2

(12) United States Patent
Xu

(10) Patent No.: US 12,746,470 B2
(45) Date of Patent: Sep. 29, 2026

(54) GUIDING MOVEMENT OF VIRTUAL OBJECT

(71) Applicant: Tencent Technology (Shenzhen) Company Limited, Shenzhen (CN)

(72) Inventor: Yajing Xu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 214 days.

(21) Appl. No.: 18/664,123

(22) Filed: May 14, 2024

(65) Prior Publication Data

US 2024/0299848 A1 Sep. 12, 2024

Related U.S. Application Data

(63) Continuation of application No. PCT/CN2023/099089, filed on Jun. 8, 2023.

(30) Foreign Application Priority Data

Aug. 19, 2022 (CN) ......................... 202211000774.5

(51) Int. Cl.
*A63F 13/5378* (2014.01)
*G06F 3/04817* (2022.01)
*G06F 3/04845* (2022.01)

(52) U.S. Cl.
CPC ...... *A63F 13/5378* (2014.09); *G06F 3/04817* (2013.01); *G06F 3/04845* (2013.01)

(58) Field of Classification Search
CPC .. A63F 13/5378; A63F 13/53; G06F 3/04817; G06F 3/04845

(Continued)

(56) References Cited

U.S. PATENT DOCUMENTS

| | | | | |
|---|---|---|---|---|
| 10,984,242 | B1 * | 4/2021 | Atlas | G06F 3/0346 |
| 2019/0099673 | A1 * | 4/2019 | Shao | A63F 13/54 |

(Continued)

FOREIGN PATENT DOCUMENTS

| | | | |
|---|---|---|---|
| CN | 108619721 | A | 10/2018 |
| CN | 110917616 | A | 3/2020 |
| CN | 112121422 | A | 12/2020 |

OTHER PUBLICATIONS

"How to Use the Skyrim Compass", dated Nov. 11, 2021; https://www.gamerguides.com/the-elder-scrolls-v-skyrim-anniversary-edition/guide/introduction/guide-information/the-compass (Year: 2021).*

(Continued)

*Primary Examiner* — Allen Chan
(74) *Attorney, Agent, or Firm* — ARENTFOX SCHIFF LLP

(57) ABSTRACT

In a method for guiding movement of a virtual object in a virtual environment, a guidance indicator for guiding the movement of the virtual object in the virtual environment is displayed. When a distance between a first game asset and the virtual object in the virtual environment is less than or equal to a first distance threshold associated with the first game asset, guidance information corresponding to the first game asset is displayed on the guidance indicator based on a relative position of the first game asset to the virtual object. A display attribute of the guidance information is adjusted based on a change in the relative position of the first game asset to the virtual object.

20 Claims, 6 Drawing Sheets

(58) Field of Classification Search
USPC .............................................................. 463/31
See application file for complete search history.

(56) References Cited

U.S. PATENT DOCUMENTS

2020/0298116 A1* 9/2020 Wang .................... A63F 13/537
2020/0316470 A1* 10/2020 Yang .................. A63F 13/5372

OTHER PUBLICATIONS

"Skyrim: Anniversary Edition", dated Nov. 11, 2021; https://en.uesp.net/wiki/Skyrim:Anniversary_Edition (Year: 2021).*
Office Action received for Chinese Patent Application No. 202211000774.5, mailed on Jan. 24, 2025 with English Translation, 20 pages.
International Search Report and Written Opinion received for PCT Patent Application No. PCT/CN2023/099089, mailed on Sep. 13, 2023, 11 pages (4 pages of English Translation and 7 pages of Original Document).
Du et al., "Application of Beidou Navigation in Forest Resources Inventory", Zhejiang Provincial Department of Natural Resources Information Center, No. 11, Nov. 30, 2021, pp. 41-43 (Official copy only).
Office Action received for Chinese Patent Application No. 202211000774.5, mailed on Jul. 2, 2025, 23 pages with English Translation.

* cited by examiner

GUIDING MOVEMENT OF VIRTUAL OBJECT

RELATED APPLICATIONS

The present application is a continuation of International Application No. PCT/CN2023/099089, filed on Jun. 8, 2023, which claims priority to Chinese Patent Application No. 202211000774.5, filed on Aug. 19, 2022. The entire disclosures of the prior applications are hereby incorporated by reference.

FIELD OF THE TECHNOLOGY

This disclosure relates to human-computer interaction technologies, including to a method and an apparatus for guiding movement of a virtual object, an electronic device, a storage medium, and a program product.

BACKGROUND OF THE DISCLOSURE

Based on a human-computer interaction technology in a virtual scene of image processing hardware, diverse interaction between virtual objects controlled by a user or artificial intelligence can be implemented based on an actual application requirement, and the human-computer interaction technology has a widely practical value. For example, in a virtual scene application such as a game, a real battle process between virtual objects can be simulated. Using a shooting game as an example, virtual objects in different groups battle in the game.

To improve an exploration ability of a player in a virtual scene, in a related technology, the player is guided in a manner of a mini map. In the mini map, an icon of an exploration object is usually displayed in a circular area in which a current position of the player is a center and a distance is a radius. However, in this guidance manner, due to a limitation of a display range of the mini map, a quantity and categories of displayed icons of exploration objects may be limited, and a single display style may be utilized. Consequently, utilization of a graphics processing resource is low.

SUMMARY

Embodiments of this disclosure include a method and an apparatus for guiding movement of a virtual object, an electronic device, a non-transitory computer-readable storage medium, and a computer program product. The embodiments may be used, for example, to enrich a display style of guidance information corresponding to an exploration object and improve utilization of a graphics processing resource.

Technical solutions of embodiments of this disclosure may be implemented as follows.

An embodiment of this disclosure provides a method for guiding movement of a virtual object. In the method, a guidance indicator for guiding the movement of the virtual object in the virtual environment is displayed. When a distance between a first game asset and the virtual object in the virtual environment is less than or equal to a first distance threshold associated with the first game asset, guidance information corresponding to the first game asset is displayed on the guidance indicator based on a relative position of the first game asset to the virtual object. A display attribute of the guidance information is adjusted based on a change in the relative position of the first game asset to the virtual object.

An embodiment of this disclosure provides an apparatus for guiding movement of a virtual object. The apparatus includes processing circuitry that is configured to display a guidance indicator for guiding movement of a virtual object in a virtual environment. The processing circuitry is configured to, when a distance between a first game asset and the virtual object in the virtual environment is less than or equal to a first distance threshold associated with the first game asset, display, on the guidance indicator, guidance information corresponding to the first game asset based on a relative position of the first game asset to the virtual object. The processing circuitry is configured to adjust a display attribute of the guidance information based on a change in the relative position of the first game asset to the virtual object.

An embodiment of this disclosure provides a terminal device, including a memory and a processor. The memory is configured to store executable instructions. The processor is configured to implement, when executing the executable instructions stored in the memory, the method for guiding movement of a virtual object provided in embodiments of this disclosure.

An embodiment of this disclosure provides a non-transitory computer-readable storage medium, storing instructions which when executed by a processor cause the processor to perform the method for guiding movement of a virtual object provided in embodiments of this disclosure.

An embodiment of this disclosure provides a computer program product, including a computer program or computer-executable instructions. When the computer program or the computer-executable instructions are executed by a processor, the method for guiding movement of a virtual object provided in embodiments of this disclosure is implemented.

Embodiments of this disclosure may include the following beneficial effects.

When embodiments of this disclosure are applied, when the distance between the target exploration object and the target virtual object exceeds the first distance within which guidance can be displayed, the guidance information corresponding to the target exploration object is displayed on the compass indicator, to guide, by using the guidance information, the target virtual object to move to the target exploration object. In addition, in a process in which the target virtual object moves to the target exploration object, the display style of the guidance information is adjusted as the relative position between the target exploration object and the target virtual object changes, so that the display style matches the relative position between the target exploration object and the target virtual object, the display style of the guidance information is enriched, and utilization of a graphics processing resource is improved. When the relative position between the target exploration object and the target virtual object changes, the display style of the guidance information changes synchronously, to better guide movement of the target virtual object, so as to help improve an exploration capability of the target virtual object in the virtual scene, and further improve exploration guidance efficiency and human-computer interaction efficiency of the virtual object in the virtual scene.

DESCRIPTION OF EMBODIMENTS

Figure 1:
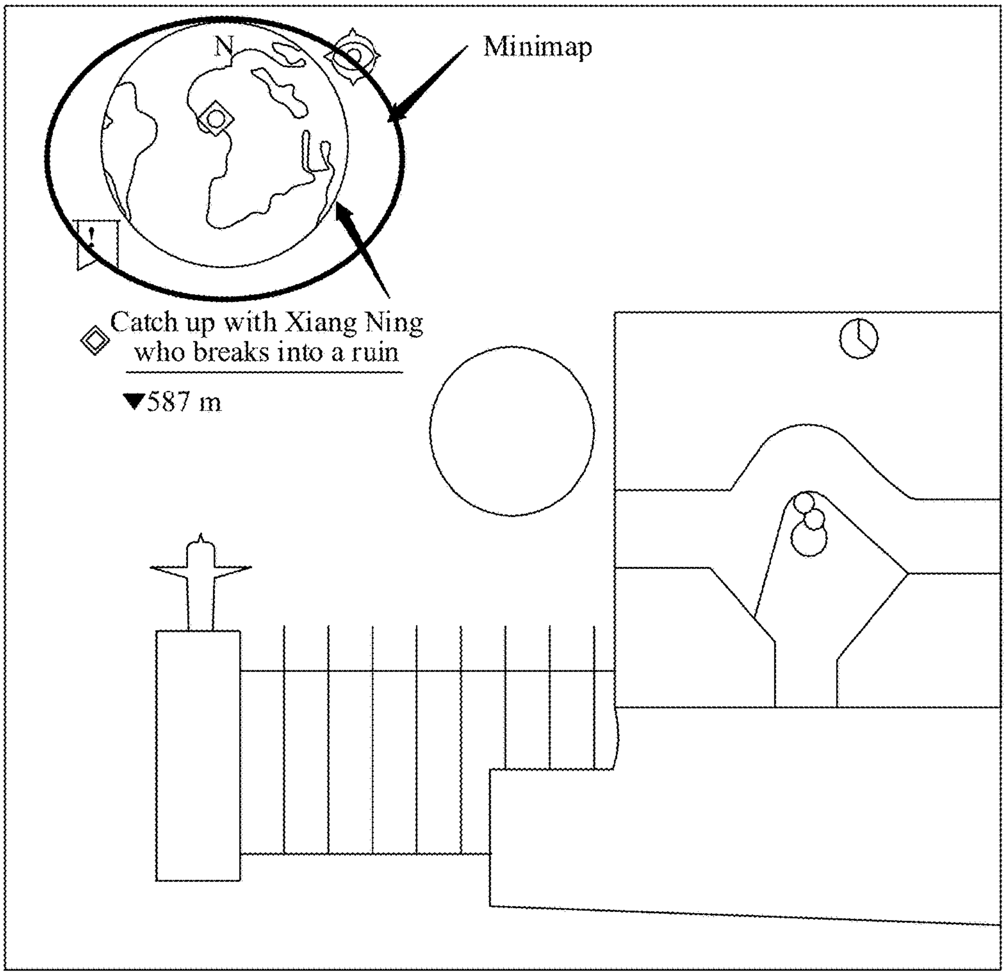
FIG. 1 is a schematic diagram of a method for guiding movement of a virtual object according to a related technology.

To make the objectives, technical solutions, and advantages of this disclosure clearer, the following describes this disclosure in further detail with reference to the accompanying drawings. The described embodiments are not to be considered as a limitation on this disclosure. Other embodiments are within the scope of this disclosure.

In the following descriptions, "some embodiments" are involved, and a subset of all possible embodiments is described. However, "some embodiments" may be a same subset or different subsets of all the possible embodiments, and may be combined with each other without conflict.

The term "first\second" involved in the following descriptions is merely for distinguishing similar objects, and does not represent a specific order of the objects. "First\second" may be interchanged in a specific order or sequence when permitted, so that embodiments of this disclosure described herein can be performed in a sequence other than those illustrated or described herein.

Unless otherwise defined, all technical and scientific terms used in this specification have same meanings as those commonly understood by a person skilled in the art belonging to this disclosure. Terms used in this specification are only intended to describe embodiments of this disclosure, and are not intended to limit this disclosure.

Before embodiments of this disclosure are described in detail, examples of nouns involved in embodiments of this disclosure are described. The nouns involved in embodiments of this disclosure are subject to the following explanations.

(1) A client may include an application program running in a terminal and configured for providing various services, such as a video play client or a game client.

(2) "In response to" may be used for representing a condition or state on which a performed operation depends. When the condition or state is satisfied, one or more performed operations may be in real time or may have a set delay. Unless otherwise specified, an execution sequence of the plurality of performed operations is not limited.

(3) A virtual scene may include a virtual scene displayed (or provided) when an application program is run on a terminal. The virtual scene can be a simulation environment of the real world, a semi-simulation and semi-fictitious virtual environment, or a purely fictitious virtual environment. The virtual scene may be any one of a two-dimensional virtual scene, a 2.5-dimensional virtual scene, or a three-dimensional virtual scene. A dimension of the virtual scene is not limited in embodiments of this disclosure. For example, the virtual scene may include the sky, land, or ocean. The land may include an environment element such as a desert or a city. A user may control a virtual object to move in the virtual scene.

(4) A virtual object may include an image of a person or an object that can interact in a virtual scene, or a movable object in a virtual scene. The movable object may be a virtual person, a virtual animal, an animation person, or the like, for example, a person or an animal displayed in the virtual scene. The virtual object may be a virtual image that is configured for representing a user in the virtual scene. The virtual scene may include a plurality of virtual objects. Each virtual object has a shape and a volume in the virtual scene, and occupies a part of space in the virtual scene. The virtual object may be a game character controlled by a user (or referred to as a player). To be specific, the virtual object is controlled by a real user, and moves in the virtual scene in response to an operation of the real user on a controller (including a touchscreen, a voice-activated switch, a keyboard, a mouse, a joystick, or the like). For example, when the real user moves the joystick to the left, the virtual object moves to the left in the virtual scene, or may stay still, jump, or use various functions (such as a skill and an item).

FIG. 1 is a schematic diagram of a method for guiding movement of a virtual object according to a related technology. In the related technology, a player is guided in a manner of a mini map in a main interface of a virtual scene. For example, an icon of an exploration object is displayed in a circular area in which a current position of the player is a center and a fixed length in a world map is intercepted as a radius. However, in this manner, due to a limitation of a display range of the mini map, a quantity and types of displayed icons of exploration objects may be limited, and a case in which no icon of an exploration object is displayed on the mini map when the player is at a position probably occurs. Consequently, utilization of a graphics processing resource is low. In addition, because the mini map occupies a part of the world map (such as four corners), the player needs to constantly switch sight between the virtual object controlled in a center of a screen and the mini map in the corner of the screen when looking at the mini map to find a path. As a result, an immersion of the player may be interrupted, and game experience may be affected.

Figure 2A:
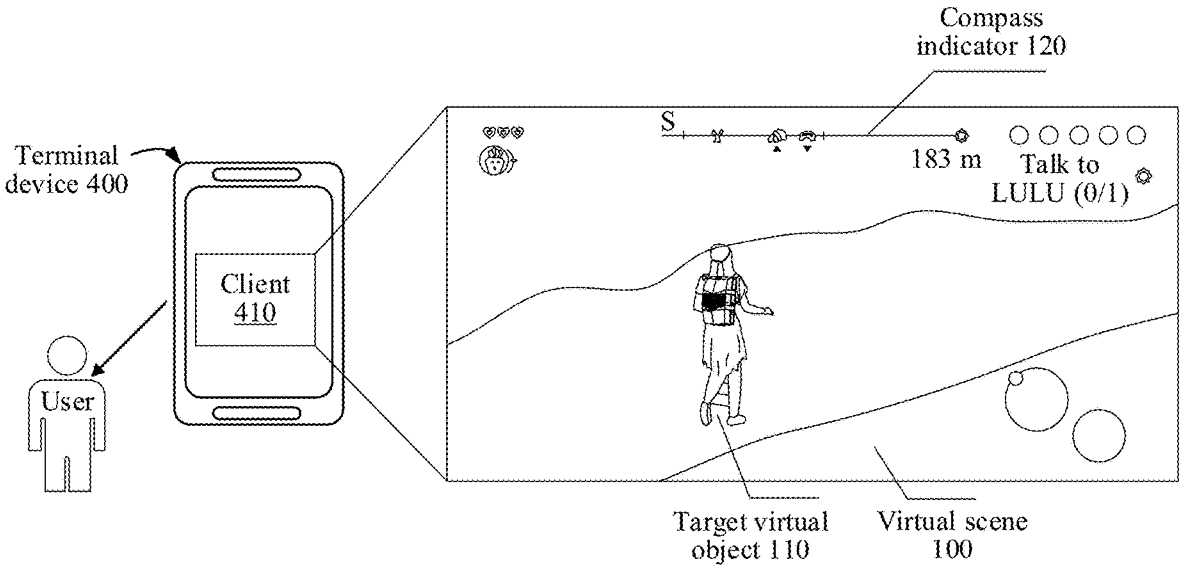
FIG. 2A is a schematic diagram of an application mode of a method for guiding movement of a virtual object according to an embodiment of this disclosure.

Therefore, embodiments of this disclosure include a method and an apparatus for guiding movement of a virtual object, a device, a computer-readable storage medium, and a computer program product, for example, to at least resolve the foregoing technical problem. In an implementation scenario, FIG. 2A is a schematic diagram of an application mode of a method for guiding movement of a virtual object according to an embodiment of this disclosure, and is applicable to some application modes, such as a stand-alone/offline game, in which data computing related to a virtual scene 100 can be completed by completely using only a computing capability of graphics processing hardware of a terminal device 400. A virtual scene is output by using terminal devices 400 of various different types, such as a smartphone, a tablet computer, and a virtual reality/augmented reality device. In an example, a type of the graphics processing hardware includes a central processing unit (CPU) and a graphics processing unit (GPU).

When visual perception of the virtual scene 100 is formed, the terminal device 400 calculates, by using graphics computing hardware, data required for display, and completes loading, parsing, and rendering of the display data. Graphics output hardware outputs a video frame that can form the visual perception of the virtual scene, for example, presents a two-dimensional video frame on a display screen of a smartphone, or projects, on lenses of augmented reality/virtual reality glasses, a video frame that achieves a three-dimensional display effect. In addition, to enrich a perception effect, the terminal device 400 may further use different hardware to form one or more of auditory perception, tactile perception, motion perception, and taste perception.

In an example, a client 410 (for example, a stand-alone game application) is run on the terminal device 400. In a running process of the client 410, a virtual scene 100 including role playing is output. The virtual scene 100 may be an environment for a game character to interact, for example, a plain, street, valley, or the like for a game character to battle. Using an example in which the terminal device 400 is a terminal corresponding to a target virtual object, the virtual scene 100 may include the target virtual object 110 and a compass indicator 120. The compass indicator 120 is configured for guiding the target virtual object 110 to move in the virtual scene.

In an example, the terminal device 400 displays the target virtual object and the compass indicator in an image of the virtual scene. When a target exploration object exists in the virtual scene, and a distance between the target exploration object and the target virtual object exceeds a first distance, guidance information corresponding to the target exploration object is displayed on the compass indicator. The target virtual object is guided, in response to a guidance instruction triggered based on the guidance information, to move to the target exploration object, and a display style (or display attribute) of the guidance information is dynamically adjusted in a movement process of the target virtual object, so that an adjusted display style adapts to a relative position between the target exploration object and the target virtual object. In other words, when the relative position between the target exploration object and the target virtual object changes, the display style of the guidance information synchronously changes. In this way, the display style of the guidance information is enriched, and utilization of a graphics processing resource is improved. In addition, the dynamically adjusted display style can better guide movement of the target virtual object, and help improve an interaction capability (such as an exploration capability) of the target virtual object in the virtual scene, and further improve human-computer interaction efficiency.

Figure 2B:
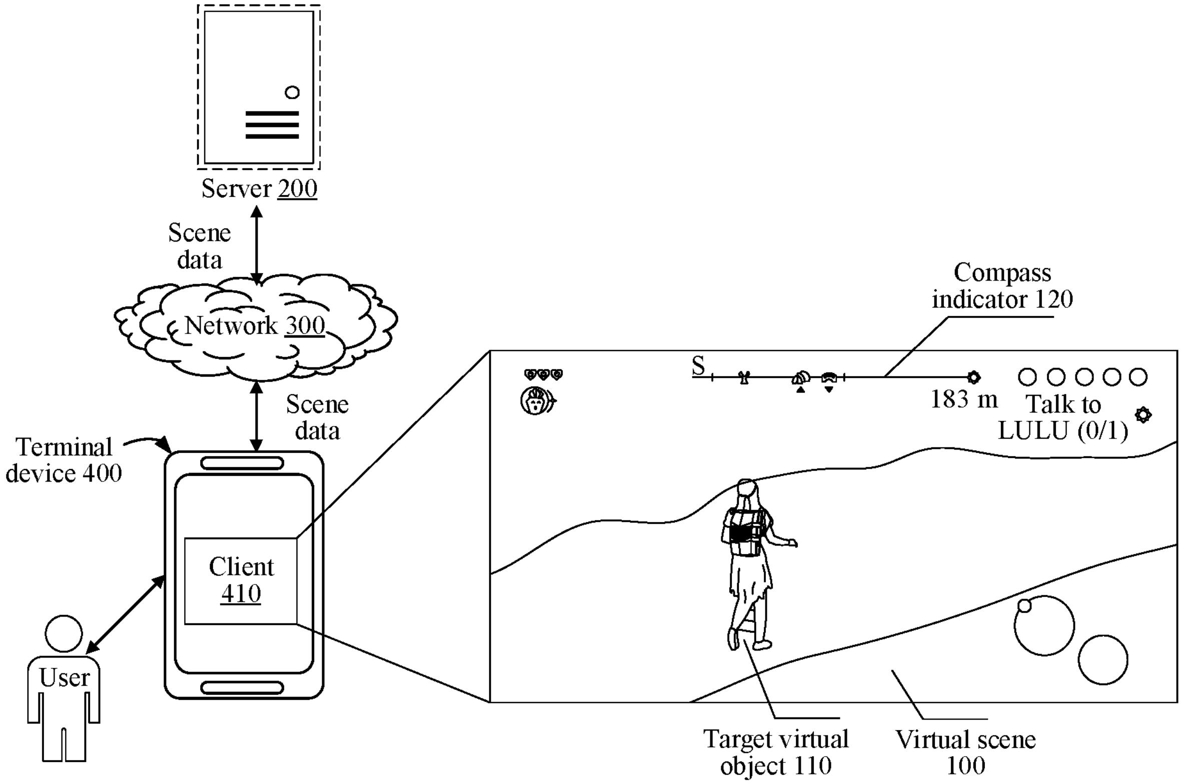
FIG. 2B is a schematic diagram of an application mode of a method for guiding movement of a virtual object according to an embodiment of this disclosure.

In another implementation, FIG. 2B is a schematic diagram of an application mode of a method for guiding movement of a virtual object according to an embodiment of this disclosure, is applied to a terminal device 400 and a server 200, and is applicable to an application mode in which computing of a virtual scene is completed by using a computing capability of the server 200 and the virtual scene is output by the terminal device 400. For example, visual perception of a virtual scene 100 is formed. The server 200 calculates display data (such as scene data) related to the virtual scene, and transmits the display data to the terminal device 400 through a network 300. The terminal device 400 completes computing of loading, parsing, and rendering of the display data by using graphics computing hardware, and outputs the virtual scene by using graphics output hardware, to form the visual perception. For example, a two-dimensional video frame is presented on a display screen of a smartphone, or a video frame that achieves a three-dimensional display effect is projected on lenses of augmented reality/virtual reality glasses. Perception of a form of the virtual scene may be output by using corresponding hardware of the terminal device 400. For example, auditory perception is formed by using a microphone, or tactile perception is formed by using a vibrator.

In an example, a client 410 (for example, a stand-alone game application) is run on the terminal device 400. In a running process of the client 410, a virtual scene 100 including role playing is output. The virtual scene 100 may be an environment for a game character to interact, for example, a plain, street, valley, or the like for a game character to battle. Using an example in which the terminal device 400 is a terminal corresponding to a target virtual object, the virtual scene 100 may include the target virtual object 110 and a compass indicator 120. The compass indicator 120 is configured for guiding the target virtual object 110 to move in the virtual scene.

In an example, the terminal device 400 displays the target virtual object and the compass indicator in an image of the virtual scene. When a target exploration object exists in the virtual scene, and a distance between the target exploration object and the target virtual object exceeds a first distance, guidance information corresponding to the target exploration object is displayed on the compass indicator. The target virtual object is guided, in response to a guidance instruction triggered based on the guidance information, to move to the target exploration object, and a display style of the guidance information is dynamically adjusted in a movement process of the target virtual object. An adjusted display style adapts to a relative position, and the relative position is a relative position between the target exploration object and the target virtual object. In this way, when the relative position between the target exploration object and the target virtual object changes, the display style of the guidance information synchronously changes, so that the display style of the guidance information is enriched, and utilization of a graphics processing resource is improved. In addition, the dynamically adjusted display style can better guide movement of the target virtual object, and help improve an interaction capability (such as an exploration capability) of the target virtual object in the virtual scene, and further improve human-computer interaction efficiency.

In some embodiments, the terminal device 400 may implement, by running a computer program, the method for guiding movement of a virtual object provided by this embodiment of this disclosure. For example, the computer program may be a native program or a software module in an operating system; may be a local (Native) application program (APP), to be specific, a program that needs to be installed in an operating system for running, such as a shooting game APP (namely, the client 410 described above); may be a mini program, to be specific, a program that is executable merely when the program is downloaded in a browser environment; or may be a mini game program that can be embedded into any APP. In conclusion, the computer program described above may be an application program, a module, or a plug-in of any form.

For example, the computer program is an application program. During actual implementation, an application program supporting a virtual scene is installed and run in the terminal device 400. The application program may be any one of a first-person shooting game (FPS), a third-person shooting game, a virtual reality application program, a three-dimensional map program, an exercise simulation program, or a multi-player gunfight survival game. A user uses the terminal device 400 to operate a virtual object located in the virtual scene to perform an activity. The activity includes but is not limited to at least one of adjusting a body posture, crawling, walking, running, riding, jumping, driving, picking up, shooting, attacking, throwing, and constructing a virtual building. For example, the virtual object may be a virtual person, such as a simulation person character or an animation person character.

In some other embodiments, this embodiment of this disclosure may alternatively be implemented by using a cloud technology (Cloud Technology). The cloud technology is a hosting technology that unifies a series of resources such as hardware, software, and a network in a wide area network or a local area network to calculate, store, process, and share data. The cloud technology is a general name of a network technology, an information technology, an integration technology, a platform management technology, an application technology, and the like that are applied based on a cloud computing business mode. A resource pool can be formed and used on demand, which is flexible and convenient. A cloud computing technology is to become an important support. A background service of a technical network system needs a large quantity of computing and storage resources.

For example, the server 200 in FIG. 2B may be an independent physical server, a server cluster or distributed system including a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal device 400 may be a smartphone, a tablet computer, a notebook computer, a desktop computer, a smart speaker, a smart watch, or the like, but is not limited thereto. The terminal device 400 and the server 200 may be connected directly or indirectly in a wired or wireless communication manner. This is not limited in this embodiment of this disclosure.

Figure 3:
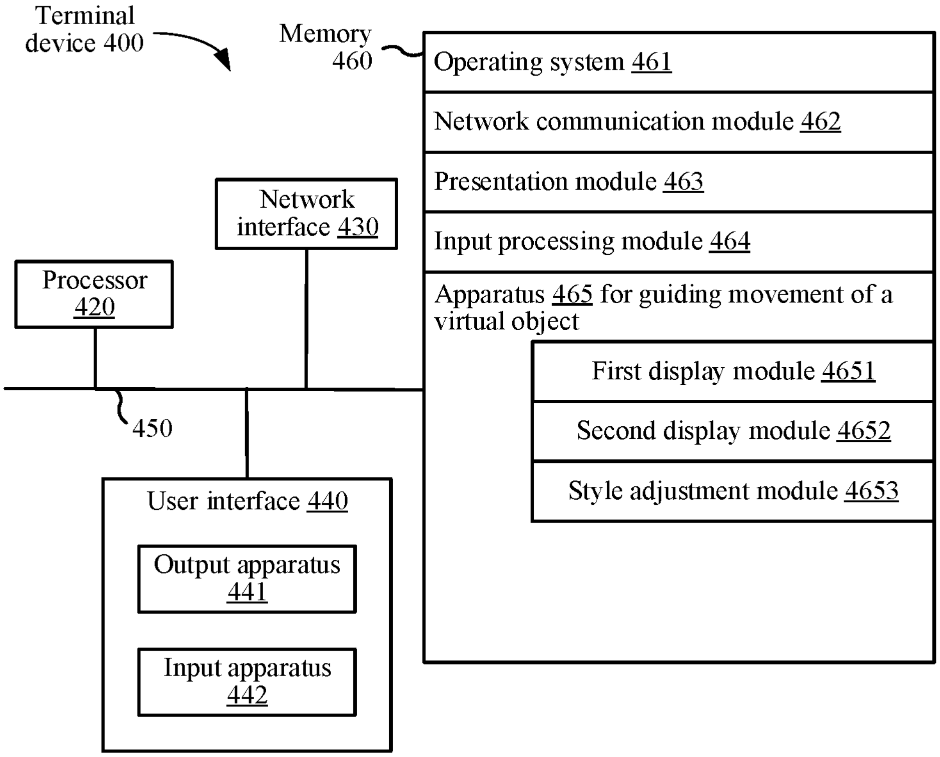
FIG. 3 is a schematic diagram of a structure of a terminal device 400 according to an embodiment of this disclosure.

The following describes an electronic device that performs the method for guiding movement of a virtual object in this embodiment of this disclosure. During actual application, the electronic device may be a terminal device or a server. An example in which the electronic device is the terminal device 400 shown in FIG. 2A is used to describe a structure of the terminal device 400 shown in FIG. 2A. FIG. 3 is a schematic diagram of a structure of a terminal device 400 according to an embodiment of this disclosure. The terminal device 400 shown in FIG. 3 includes at least one processor 420, a memory 460, at least one network interface 430, and a user interface 440. Various components in the terminal device 400 are coupled together by using a bus system 450. The bus system 450 is configured for implementing connection communication between the components. In addition to a data bus, the bus system 450 further includes a power bus, a control bus, and a state signal bus. However, for clear description, the various buses are denoted as the bus system 450 in FIG. 3.

Processing circuitry, such as the processor 420, may include an integrated circuit chip having a signal processing capability, such as a general-purpose processor, a digital signal processor (DSP), or another programmable logic device, a discrete gate or transistor logic device, or a discrete hardware component. The general-purpose processor may be a microprocessor, any conventional processor, or the like.

The user interface 440 includes one or more output apparatuses 441 that can present media content, where the output apparatus includes one or more speakers and/or one or more visual display screens. The user interface 440 further includes one or more input apparatuses 442, where the input apparatus includes a user interface component that helps user input, such as a keyboard, a mouse, a microphone, a touchscreen display screen, a camera, or another input button and control.

The memory 460 may be removable, non-removable, or a combination thereof. For example, a hardware device includes a solid-state memory, a hard disk drive, or an optical disk drive. In one embodiment, the memory 460 includes one or more storage devices physically located away from processor 420.

The memory 460 includes a volatile memory or a non-volatile memory, and may include both a volatile memory and a non-volatile memory. The non-volatile memory may be a read-only memory (ROM), and the volatile memory may be a random access memory (RAM). The memory 460 described in this embodiment of this disclosure is intended to include a memory of any suitable type.

In some embodiments, the memory 460 can store data to support various operations. An example of the data includes a program, a module, a data structure, or a subsets or superset thereof. Example descriptions are provided below. An operating system 461 includes a system program configured for processing various basic system services and performing a hardware-related task, such as a framework layer, a core library layer, or a driver layer, configured for implementing various basic services and processing a hardware-based task. A network communication module 462 is configured for reaching another computing device through one or more (wired or wireless) network interfaces 430. For example, the network interface 430 includes Bluetooth, Wi-Fi, and a universal serial bus (USB). A presentation module 463 is configured for presenting information by using one or more output apparatuses 441 (for example, display screens or speakers) associated with the user interface 440 (for example, a user interface configured for operating a peripheral device and displaying content and information). An input processing module 464 is configured for detecting user input or interaction from one or more input apparatuses 442 and translating the detected input or interaction.

In some embodiments, an apparatus for guiding movement of a virtual object provided by an embodiment of this disclosure may be implemented in a software manner. FIG. 3 shows an apparatus 465 that is for guiding movement of a virtual object and that is stored in a memory 460. The apparatus 465 may be software in a form such as a program or a plug-in, and includes the following software modules: a first display module 4651, a second display module 4652, and a style adjustment module 4653. The modules are logical, so that the modules can be combined or split arbitrarily based on an implemented function. Functions of the modules are described in the following specification.

In some other embodiments, an apparatus for guiding movement of a virtual object provided by an embodiment of this disclosure may be implemented in a hardware manner. In an example, the apparatus for guiding movement of a virtual object provided by this embodiment of this disclosure may be a processor in a form of a hardware decoding processor, and is programmed to execute a method for guiding movement of a virtual object provided by an embodiment of this disclosure. For example, the processor in the form of a hardware decoding processor may adopt one or more application specific integrated circuits (ASICs), DSPs, programmable logic devices (PLDs), complex programmable logic devices (CPLDs), field-programmable gate arrays (FPGAs) or other electronic components.

Figure 4:
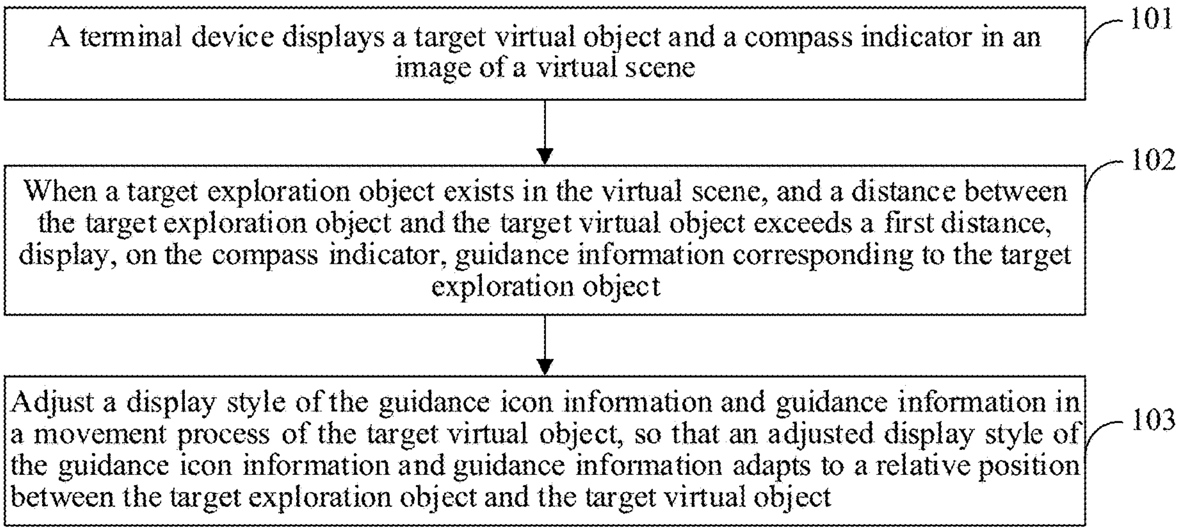
FIG. 4 is a schematic flowchart of a method for guiding movement of a virtual object according to an embodiment of this disclosure.

The following describes, with reference to the accompanying drawings, a method for guiding movement of a virtual object provided by an embodiment of this disclosure. The method for guiding movement of a virtual object provided by this embodiment of this disclosure may be independently performed by the terminal device 400 in FIG. 2A, or may be jointly performed by the terminal device 400 and the server 200 in FIG. 2B. Descriptions are provided below by using an example in which the terminal device 400 in FIG. 2A independently performs the method for guiding movement of a virtual object provided by this embodiment of this disclosure. FIG. 4 is a schematic flowchart of a method for guiding movement of a virtual object according to an embodiment of this disclosure. Descriptions are provided with reference to operations shown in FIG. 4.

The method shown in FIG. 4 may be performed by various forms of computer programs run on the terminal device 400, but the computer programs are not limited to the foregoing client 410, and may alternatively be the foregoing operating system 461, a software module, or a script. Therefore, the client is not to be considered as a limitation on this embodiment of this disclosure.

Operation 101: A terminal device displays a target virtual object and a compass indicator in an image of a virtual scene. In an example, a guidance indicator for guiding the movement of the virtual object in the virtual environment is displayed.

The target virtual object is a virtual object corresponding to a current login account in the virtual scene, and the terminal device is a terminal corresponding to the current login account or the target virtual object. A client that supports the virtual scene is installed in the terminal device. The client may be a dedicated client for the virtual scene. For example, when the virtual scene is a game, the corresponding client may be a shooting game APP. The client may alternatively be a client with a function of the virtual scene, such as an instant messaging client or a media information play client. When a user opens the client installed in the terminal device and the terminal device runs the client, an image in which the virtual scene is observed from a perspective of the target virtual object is displayed in the client. For example, the target virtual object and the compass indicator that is configured for guiding the target virtual object to move in the virtual scene are displayed.

During actual application, the compass indicator may have transparency, and an indication graduation is distributed on the compass indicator, to display corresponding guidance information at the indication graduation. A display position of the compass indicator in the virtual scene may be adjusted. For example, the compass indicator may be displayed directly at the top of the image, or may be displayed at any other position that is convenient for a player to view in the image.

The display position of the compass indicator herein may be freely adjusted by a player object. In some embodiments, the display position of the compass indicator may be adjusted in the following manner: The terminal controls the compass indicator in response to a position adjustment instruction for the compass indicator, to enable the compass indicator to be in a movable state, and controls, in response to a drag operation for the compass indicator, the compass indicator to be dragged to a position indicated by the drag operation. The position adjustment instruction may be triggered in a plurality of manners, for example, triggered by using a voice instruction, or triggered by using a pressing operation (such as a long pressing operation whose pressing duration reaches a duration threshold) for the compass indicator.

Operation 102: When a target exploration object exists in the virtual scene, and a distance between the target exploration object and the target virtual object exceeds a first distance, display, on the compass indicator, guidance information corresponding to the target exploration object. In an example, when a distance between a first game asset and the virtual object in the virtual environment is less than or equal to a first distance threshold associated with the first game asset, guidance information corresponding to the first game asset is displayed on the guidance indicator based on a relative position of the first game asset to the virtual object.

The guidance information is configured for guiding the target virtual object to move in the virtual scene, for example, guiding the target virtual object to move to a position close to the target exploration object, or guiding the target virtual object to move to a position away from the target exploration object.

During actual application, the guidance information herein may be displayed on the compass indicator in a plurality of forms. For example, the guidance information may be displayed in a text form, a graphic form, or an icon form.

In some embodiments, before the terminal device displays, on the compass indicator, the guidance information corresponding to the target exploration object, the terminal device may perform category identification on the target exploration object, to obtain a category corresponding to the target exploration object; and determine, based on the category of the target exploration object, the first distance corresponding to the target exploration object.

During actual application, various types of exploration objects may exist in the virtual scene, such as a mountain, a bridge, woods, a virtual ore that can be mined, a virtual item that can be picked up, another virtual object (a virtual object corresponding to another login account different from the current login account in the virtual scene), or a non-player character (NPC). When the target exploration object is detected, a camera component bound to the target virtual object emits detection rays from a position of the target virtual object to the surroundings. Whether the target exploration object exists in the virtual scene is determined based on the detection rays. When the detection ray has an intersection with an impactor component (such as an impacting box or an impacting ball) bound to the target exploration object, it is determined that the target exploration object exists in the virtual scene. When the detection ray does not have an intersection with the impactor component bound to the exploration object, it is determined that no target exploration object exists in the virtual scene.

To improve effectiveness of guidance, detection distances (distances (distances between exploration objects and the target virtual object) configured for triggering displaying, on the compass indicator, guidance information corresponding to the corresponding exploration objects, for example, the first distance corresponding to the target exploration object) corresponding to exploration objects of different categories are different. For example, when the exploration object is a teleportation point with a teleportation function (for example, teleporting the target virtual object from one side of the virtual scene to the other side), a player expects to be able to see the exploration object from a large distance. Therefore, a detection distance corresponding to the exploration object is large. For another example, when the exploration object is a virtual item that can be picked up, only when the exploration object is located near the target virtual object, a player can have an opportunity to pick up the exploration object. Therefore, a detection distance corresponding to the exploration object is small. As a result, a correspondence relationship between a category of an exploration object and a detection distance may be created.

After existence of the target exploration object in the virtual scene is detected, category identification may be performed on the target exploration object. For example, category identification is performed on the target exploration object by using a machine-learning category identification model, to obtain the category corresponding to the target exploration object. The first distance (namely, the detection distance) corresponding to the target exploration object is determined based on the category obtained through identification and the correspondence relationship between the category and the detection distance. When the distance between the target exploration object and the target virtual object exceeds (is greater than or equal to) the first distance, the guidance information corresponding to the target exploration object may be displayed on the compass indicator. The guidance information includes at least one of the following: a guidance icon corresponding to the target exploration object and the relative position (such as the distance or an orientation) between the target exploration object and the target virtual object. During actual application, the guidance information may be information about a guidance icon. In addition, when the guidance information includes the guidance icon corresponding to the target exploration object, the guidance information may further include information (such as an orientation of the guidance icon in the compass indicator) about a display position of the guidance icon on the compass display, to guide the target virtual object to move in the virtual scene.

In the foregoing manner, only guidance information corresponding to an exploration object that satisfies a corresponding detection distance can be displayed on the compass indicator. Different detection distances are set for different categories of exploration objects, to effectively control a quantity of pieces of guidance information displayed on the compass indicator (that is, reduce a quantity and types of displayed exploration objects), so that the guidance information displayed on the compass indicator is more appropriate, and the guidance information displayed on the compass indicator is not excessively much or little, to improve the effectiveness of guidance.

Operation 103: Adjust a display style of the guidance information in a movement process of the target virtual object, where an adjusted display style of the guidance information adapts to a relative position between the target exploration object and the target virtual object. In an example, a display attribute of the guidance information is adjusted based on a change in the relative position of the first game asset to the virtual object.

During actual application, a player can view the guidance information displayed on the compass indicator to trigger a guidance instruction configured for guiding the target virtual object to move. For example, in response to a trigger operation for an operating control (a control configured for controlling the target virtual object to move in the virtual scene, which may be a real button in an input device such as a mouse or a keyboard, or may be a virtual button presented in the image of the virtual scene) and based on the guidance information, the terminal device receives the guidance instruction for the target virtual object, and guides (namely, controls), in response to the guidance instruction, the target virtual object to move to a position of the target exploration object.

In a process of controlling or guiding the target virtual object to move in the virtual scene, the terminal device may adjust, in real time and based on a change of the relative position between the target exploration object and the target virtual object, the display style of the guidance information corresponding to the target exploration object, so that the display style of the guidance information matches the relative position between the target exploration object and the target virtual object. In this way, when the relative position between the target exploration object and the target virtual object changes, the display style of the guidance information changes synchronously, so that not only the display style of the guidance information is enriched, but also utilization of a graphics processing resource is improved. The adjusted display style can better guide movement of the target virtual object, to help improve an exploration capability of the target virtual object in the virtual scene, and further improve human-computer interaction efficiency.

The following describes displaying of the guidance information, adjustment of the display style of the guidance information, and the like in detail.

In some embodiments, the terminal device may display, on the compass indicator in the following manner, the guidance information corresponding to the target exploration object: when an indication graduation is distributed on the compass indicator, obtaining a first relative position between the target exploration object and the target virtual object, a second relative position between an exploration object and a virtual object in the virtual scene, and a first mapping relationship between the second relative position and the indication graduation on the compass indicator; and determining, based on the first mapping relationship, a first target indication graduation corresponding to the first relative position on the compass indicator, and displaying, at the first target indication graduation, the guidance information corresponding to the target exploration object.

During actual application, a relative position between the exploration object and the virtual object in the virtual scene is the second relative position, a mapping relationship is preset between the second relative position and the indication graduation on the compass indicator, and the mapping relationship is the first mapping relationship, so that when the relative position between the target exploration object and the target virtual object is learned, the first target indication graduation corresponding to the first relative position on the compass indicator can be determined based on the first mapping relationship.

Figure 5:
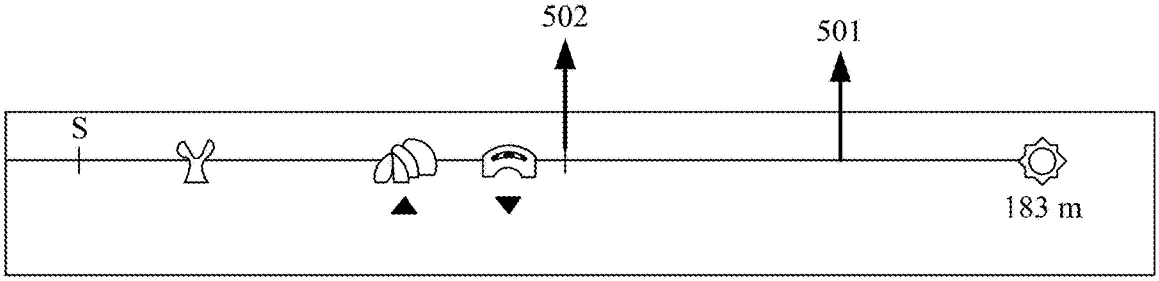
FIG. 5 is a schematic diagram of displaying on a compass indicator according to an embodiment of this disclosure.

FIG. 5 is a schematic diagram of displaying on a compass indicator according to an embodiment of this disclosure. The compass indicator may be an indicator bar 501 (occupying a low proportion of the image of the virtual scene) with transparency. A plurality of indicator graduations are distributed on the indicator bar. The indicator bar 501 may be divided into a plurality of left and right symmetrical indication graduations based on relative positions between exploration objects and the target virtual object. Guidance information of an indication graduation 502 located in the middle of the indication bar indicates that a corresponding exploration object is located directly in front of the target virtual object. Guidance information of an indication graduation located on the left of the indicator bar indicates that a corresponding exploration object is located in left front of the target virtual object. Guidance information of an indication graduation located on the right of the indicator bar indicates that a corresponding exploration object is located in right front of the target virtual object.

Before the terminal device displays the guidance information corresponding to the target exploration object on the compass indicator, the terminal device may establish in advance the relative position (namely, the second relative position) between the exploration object and the virtual object in the virtual scene, for example, a relative position 1 that is between an exploration object A and a virtual object 1 in the virtual scene and that corresponds to an indication graduation 1 on the compass indicator. In this case, the exploration object A is displayed at the indication graduation 1. For another example, a relative position 2 between an exploration object B and a virtual object 1 in the virtual scene corresponds to an indication graduation 2 on the compass indicator. In this case, the exploration object B is displayed at the indication graduation 2. Therefore, when the guidance information corresponding to the target exploration object is displayed on the compass indicator, the terminal device needs to obtain the first relative position between the target exploration object and the target virtual object, and obtain, based on the first mapping relationship, the first target indication graduation corresponding to the first relative position on the compass indicator, to display, on the compass indicator, the guidance information corresponding to the target exploration object.

In some embodiments, when the target exploration object exists in the virtual scene, and the distance between the target exploration object and the target virtual object exceeds the first distance, the terminal device may display, in the following manner on the compass indicator, the guidance information corresponding to the target exploration object: obtaining a target area in which a position at which the target virtual object is located is a circle center and a second angle is a target angle, and using the target area as a display area of the compass indicator, where a straight line on which a direction of the target virtual object is located is an angle bisector of the second angle; and when the target exploration object exists in the display area in the virtual scene, and the distance between the target exploration object and the target virtual object exceeds the first distance, displaying, on the compass indicator, the guidance information corresponding to the target exploration object.

Figure 6:
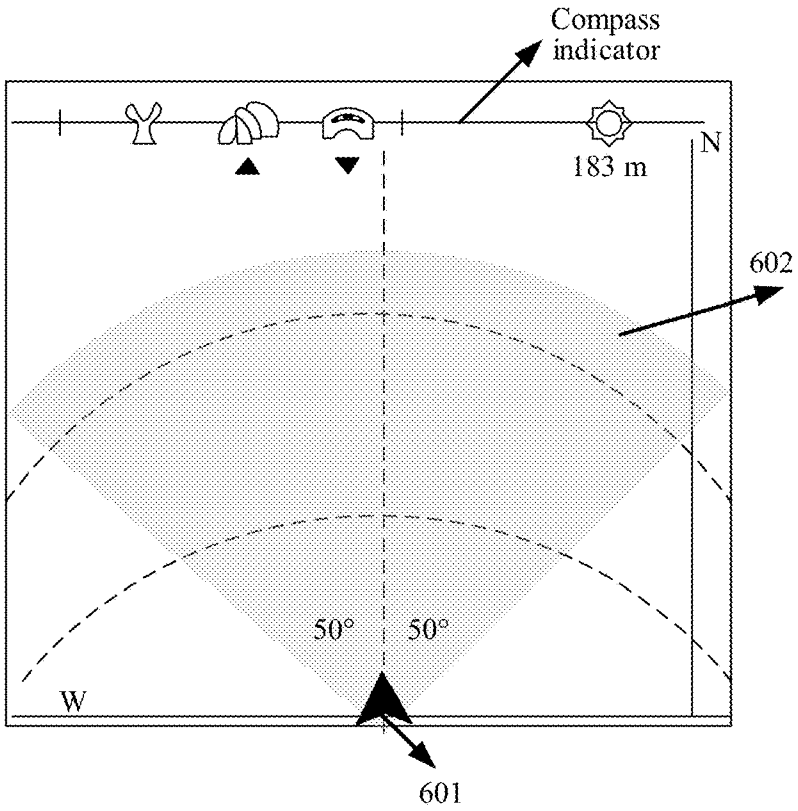
FIG. 6 is a schematic diagram of displaying of guidance information according to an embodiment of this disclosure.

FIG. 6 is a schematic diagram of displaying of guidance information according to an embodiment of this disclosure. During actual application, in consideration of that guidance information corresponding to an exploration object located in front of a player has an effective guiding function (because the player controls a game character to move forward in a game), the image of the virtual scene displayed on the terminal device is usually an image within a sight range of the target virtual object. In the image, a target area 602 (such as a sector area) in which a position at which a target virtual object 601 is located is a circle center and a target angle is an angle (namely, the second angle, which can be set, for example, set to 100 degrees) along a direction of the target virtual object is used as the display area of the compass indicator. When a distance between an exploration object in the display area and the target virtual object satisfies a detection distance, guidance information corresponding to the exploration object may be displayed on the compass indicator.

In some embodiments, the terminal device may display, in the following manner on the compass indicator, the guidance information corresponding to the target exploration object: when an indication graduation is distributed on the compass indicator, obtaining a third angle corresponding to the target exploration object, and a second mapping relationship between a fourth angle corresponding to an exploration object in the display area and the indication graduation on the compass indicator, where the third angle is an angle between the angle bisector of the second angle and a second connection line between the target exploration object and the target virtual object, the fourth angle is an angle between an angle bisector corresponding to a virtual object and a third connection line between the exploration object and the virtual object in the virtual scene; and determining, based on the second mapping relationship, a second target indication graduation corresponding to the third angle on the compass indicator, and displaying, at the second target indication graduation, the guidance information corresponding to the target exploration object.

Figure 7:
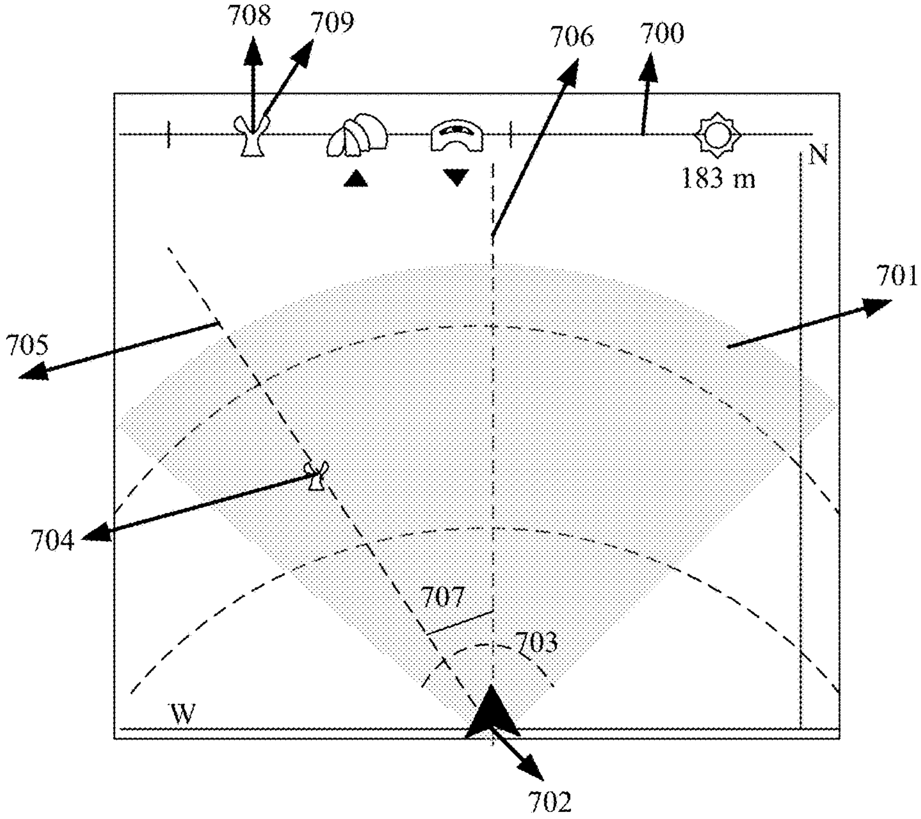
FIG. 7 is a schematic diagram of displaying of guidance information according to an embodiment of this disclosure.

FIG. 7 is a schematic diagram of displaying of guidance information according to an embodiment of this disclosure. For a target exploration object 704 in a display area 701 (such as a sector area in which a target virtual object 702 is a circle center and an angle 703 is a target angle) of the compass indicator 700, before the terminal device displays guidance information corresponding to the target virtual object, the terminal device may first obtain a second mapping relationship between an angle (namely, the fourth angle) corresponding to an exploration object in the virtual scene and the indication graduation on the compass indicator. The fourth angle corresponding to the exploration object is an angle between a connection line between the exploration object and a virtual object and an angle bisector (an angle bisector that uses the virtual object as a circle center and the target angle as an angle) corresponding to the virtual object. For example, a fourth angle corresponding to an exploration object A in the virtual scene is a degrees, and corresponds to an indication graduation 1 on the compass indicator. In this case, the exploration object A is displayed at the indication graduation 1. For another example, a fourth angle corresponding to an exploration object B in the virtual scene is b degrees, and corresponds to an indication graduation 2 on the compass indicator. In this case, the exploration object B is displayed at the indication graduation 2. When the guidance information corresponding to the target exploration object 704 is displayed on the compass indicator 700, the terminal device needs to obtain the third angle corresponding to the target exploration object 704, namely, a second connection line 705 between the target exploration object 704 and the target virtual object 702, and a third angle 707 between an angle bisector 706 of the angle 703 of the display area 701, and obtain, based on the second mapping relationship, a second target indication graduation 708 corresponding to the third angle 707 on the compass indicator, to display, on the second target indication graduation 708, the guidance information 709 corresponding to the target exploration object 704.

In some embodiments, when another exploration object exists on the second connection line, the terminal device may display, in the following manner at the second target indication graduation, the guidance information corresponding to the target exploration object: displaying, in a scrolling manner at the second target indication graduation, the guidance information corresponding to the target exploration object and guidance information corresponding to the another exploration object; displaying, in parallel on a vertical line on which the second target indication graduation is located, the guidance information corresponding to the target exploration object and guidance information corresponding to the another exploration object; or displaying, in a superposition manner at the second target indication graduation and by using display styles of different visibilities, the guidance information corresponding to the target exploration object and guidance information corresponding to the another exploration object, where the visibility is in positive correlation with exploration priorities of the target exploration object and the another exploration object.

Figure 8:
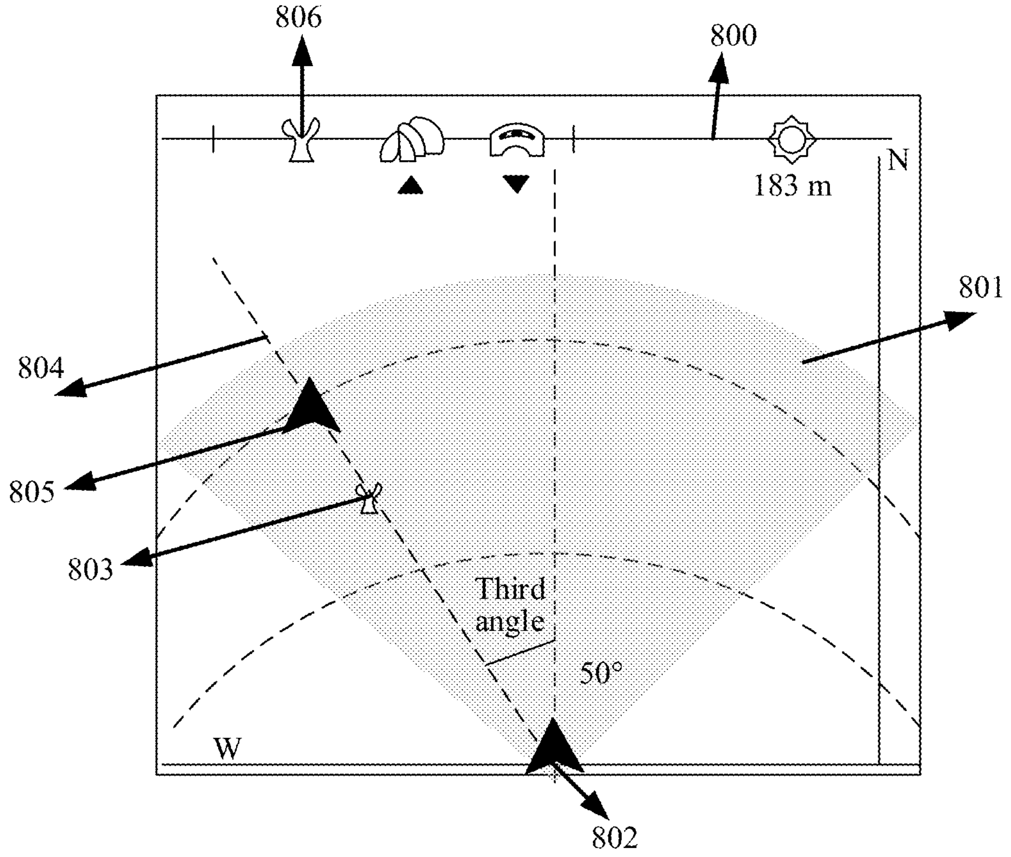
FIG. 8 is a schematic diagram of displaying of guidance information according to an embodiment of this disclosure.

FIG. 8 is a schematic diagram of displaying of guidance information according to an embodiment of this disclosure. For a target exploration object 803 located in a display area 801 of a compass indicator 800, if another exploration object 805 exists on a second connection line 804 between the target exploration object 803 and a target virtual object 802, because a third angle corresponding to the target exploration object 803 is the same as a third angle corresponding to the another exploration object 805, an indication graduation corresponding to the target exploration object 803 on the compass indicator and an indication graduation corresponding to the another exploration object 805 on the compass indicator are a same indication graduation (namely, a second target indication graduation 806). When guidance information corresponding to a plurality of exploration objects is displayed at the same indication graduation, the guidance information may be displayed in a plurality of display manners.

For example, guidance information corresponding to the target exploration object 803 and guidance information corresponding to the another exploration object 805 may be sequentially displayed at the second target indication graduation in a scrolling manner. A frequency of sequentially displaying in the scrolling manner may be set. Alternatively, guidance information corresponding to the target exploration object 803 and guidance information corresponding to the another exploration object 805 may be displayed in parallel (in parallel up and down) on a vertical line on which the second target indication graduation is located. In addition, the terminal device may alternatively obtain exploration priorities of the target exploration object 803 and the another exploration object 805, and display, based on the different exploration priorities, guidance information of corresponding exploration objects by using different display styles. In particular, guidance information of an exploration object with a highest exploration priority is displayed in a prominent manner. Alternatively, guidance information of an exploration object with a high exploration priority is displayed selectively. For example, it is assumed that an exploration priority of the target exploration object 803 is higher than an exploration priority of the another exploration object 805. When the guidance information of the target exploration object 803 and the guidance information of the another target exploration object 805 are displayed in a superposition manner, the guidance information of the target exploration object 803 with the higher exploration priority is displayed in the prominent manner. For example, a layer corresponding to the guidance information of the target exploration object 803 is superimposed on a layer corresponding to the guidance information of the another exploration object 805, so that a visibility of the guidance information of the target exploration object 803 is higher than that of the guidance information of the another exploration object 805. In this way, the target virtual object can be effectively guided to move to the exploration object with the higher visibility, to explore a most needed exploration object as soon as possible, thereby improving exploration efficiency or human-computer interaction efficiency.

When obtaining an exploration priority of an exploration object, the terminal device may first obtain exploration reference data (such as a relative position between the exploration object and the target virtual object, a type of the exploration object, an exploration progress of the target virtual object in the virtual scene, or importance of the exploration object), invoke, based on the exploration reference data, a machine-learning model to predict the exploration priority of the exploration object, and obtain the exploration priority of the exploration object, so that a prediction result is more accurate. The foregoing machine-learning model may be a neural network model (such as a convolutional neural network, a deep convolutional neural network, or a fully connected neural network), a decision tree model, a gradient boosting tree, a multi-layer perceptron, a support vector machine, or the like. A type of the machine-learning model is not limited in this embodiment of this disclosure.

In some embodiments, when the target exploration object exists in an area other than the display area in the virtual scene, and the target exploration object is a tracing exploration object, the guidance information corresponding to the target exploration object is displayed in a prominent manner at an endpoint position on the compass indicator.

If the target exploration object is located in the area other than the display area of the compass indicator, and the target exploration object is the tracing exploration object (an object traced by the target virtual object), the relative position between the target exploration object and the target virtual object may be ignored, and the guidance information of the target exploration object is controlled to be constantly displayed at both ends of the compass indicator and in the prominent manner (for example, by using a flashing special effect). In other words, in this case, a change of the relative position between the target exploration object and the target virtual object does not affect displaying of the guidance information. In this way, the target virtual object can be effectively guided to move to the traced exploration object, so that the target exploration object can be traced as soon as possible, thereby improving tracing efficiency or human-computer interaction efficiency.

In some embodiments, the terminal device may display, in the following manner on the compass indicator, the guidance information corresponding to the target exploration object: when the guidance information includes a guidance icon and position indication information that correspond to the target exploration object, displaying the guidance icon on the compass indicator, and displaying the position indication information in an associated display area of the guidance icon, where the position indication information is configured for indicating at least one of the following position information: a distance between the target exploration object and the target virtual object, or a height difference between the target exploration object and the target virtual object.

The guidance icon corresponds to the target exploration object. The guidance icon is any identifier (such as a picture identifier or a text identifier) configured for indicating the target exploration object. For example, when the target exploration object is a "mountain", a corresponding guidance icon may be a picture identifier indicating a shape of the mountain or a text identifier (such as mountain) of the mountain. The position indication information is configured for indicating the distance between the target exploration object and the target virtual object, such as a linear distance, a horizontal distance, or a vertical distance. The position indication information may alternatively indicate the height difference between the target exploration object and the target virtual object, where the height difference may be represented by using a height difference mark. For example, a positive triangle indicates that a height of the target exploration object is greater than a height of the target virtual object, and an inverted triangle indicates that the height of the target exploration object is less than the height of the target virtual object. The height difference may alternatively be represented by using a height difference value. For example, +10 meters indicates that the height of the target exploration object is greater than the height of the target virtual object, and a height difference value is 10 meters. The associated display area of the guidance icon may be any associated area around the guidance icon.

As shown in FIG. 5, for example, when the target exploration object is a "mountain", a guidance icon (a picture identifier of a shape of the mountain) corresponding to the target exploration object "mountain" is displayed on the compass indicator, and position indication information (such as a "positive triangle", indicating that a height of a position of the target exploration object, the mountain, is greater than a height of a position of the target virtual object) is displayed in an associated display area of the guidance icon. For another example, when the target exploration object is a "bridge", a guidance icon (a picture identifier of a shape of the bridge) corresponding to the target exploration object "bridge" is displayed on the compass indicator, and position indication information (such as an "inverted triangle", indicating that a height of a position of the target exploration object, the bridge, is less than a height of a position of the target virtual object) is displayed in an associated display area of the guidance icon. For another example, when the target exploration object is a "small monster" (such as an NPC), a guidance icon (a picture identifier of a shape of the small monster) corresponding to the target exploration object "small monster" is displayed on the compass indicator, and position indication information (such as "183 meters", indicating that a distance between the target exploration object, the small monster, and the target virtual object is 183 meters) is displayed in an associated display area of the guidance icon.

In some embodiments, when the position information indicated by the position indication information includes the height difference, the terminal device may determine the height between the target virtual object and the target exploration object in the following manner: obtaining a first connection line between the target virtual object and the target exploration object, and obtaining a first angle between the first connection line and a horizontal line on which the target virtual object is located; and determining the height difference between the target exploration object and the target virtual object based on the first angle.

When the target exploration object and the target virtual object are not located on a same horizontal line, in other words, when the angle between the first connection line between the target virtual object and the target exploration object and the horizontal line on which the target virtual object is located is not 0 degrees or 180 degrees, a vertical height difference between the target exploration object and the target virtual object is determined as the height difference between the target exploration object and the target virtual object. When the height difference is greater than 0, the height of the target exploration object is greater than the height of the target virtual object. When the height difference is less than 0, the height of the target exploration object is less than the height of the target virtual object.

In some embodiments, the terminal device may adjust the display style of the guidance information in the following manner: as the relative position between the target exploration object and the target virtual object changes, correspondingly adjusting a display size of the guidance icon, to enable the display size of the guidance icon to match the relative position; and updating the position information indicated by the position indication information, to enable the position information indicated by the position indication information to be consistent with the relative position.

As the relative position between the target exploration object and the target virtual object changes, the display style of the guidance information corresponding to the target exploration object is correspondingly adjusted. For example, the display size and the position indication information of the guidance icon in the guidance information are adjusted. For example, as the distance between the target exploration object and the target virtual object is smaller, the display size of the guidance icon of the target exploration object is gradually increased, and the position information is updated and displayed. For example, the distance or the height difference value between the target exploration object and the target virtual object is reduced.

In some embodiments, in a process of correspondingly adjusting the display size of the guidance icon, the terminal device may further display, in the associated display area of the guidance icon, a special effect element corresponding to the guidance icon. The special effect element is configured for indicating that the distance between the target exploration object and the target virtual object is less than a second distance, where the second distance is less than the first distance.

In the process in which the display size of the guidance icon corresponding to the target exploration object is correspondingly adjusted, for example, in a process in which the guidance icon corresponding to the target exploration object is changed from small to large, the special effect element is displayed in the associated display area of the guidance icon for coherence. For example, a special effect that a star pops out and twinkles is displayed at the guide icon, to prompt that the target exploration object is near a player, so that the player explores the target exploration object as soon as possible, thereby helping improve exploration efficiency or human-computer interaction efficiency.

As the distance between the target exploration object and the target virtual object changes, the special effect element corresponding to the guidance icon displayed in this embodiment of this disclosure may be configured for not only indicating a continuous changing process of the display size of the guidance icon, but also indicating an instant change of the display size of the guidance icon. For example, it is assumed that, when the distance between the target exploration object and the target virtual object is the first distance (which may be set, for example, set to 120 meters), the display size of the guidance icon corresponding to the target exploration object is a*a (where a is a positive number), and when the distance between the target exploration object and the target virtual object is the second distance (which is less than the first distance and may be set, for example, set to 100 meters), the display size of the guidance icon corresponding to the target exploration object is b*b (where b is a positive number greater than a). In this case, in a process in which the target virtual object is controlled to move to the target exploration object, as the distance between the target exploration object and the target virtual object decreases, for example, the distance between the target exploration object and the target virtual object changes from the first distance to the second distance, the special effect element displayed in the associated display area of the guidance icon may be configured for indicating a process in which the display size of the guidance icon gradually increases. For example, in a process in which the display size of the guidance icon gradually changes from a*a to c*c (where c is a positive number greater than a and less than b) until the display size changes to b*b, the change of the display size of the guidance icon is cohered by displaying the special effect element, so that a player is provided with a smooth vision feeling.

In addition, in a scenario in which the special effect element is configured for indicating the instant change (namely, a sudden change) of the display size of the guidance icon, for example, when the distance between the target exploration object and the target virtual object is the first distance, the display size of the guidance icon is a*a, in the process in which the target virtual object is controlled to move to the target exploration object, as the distance between the target exploration object and the target virtual object decreases, before the distance between the target exploration object and the target virtual object changes to the second distance, the display size of the guidance icon is always a*a, and at a moment at which the distance between the target exploration object and the target virtual object changes to the second distance, the display size of the guidance icon suddenly changes to b*b, the special effect elements displayed at this moment can indicate the sudden change of the display size of the guidance icon, so that a player is provided with exciting visual experience.

In some embodiments, when the guidance information includes a guidance icon corresponding to the target exploration object, the terminal device may display, in the following manner on the compass indicator, the guidance information corresponding to the target exploration object: when at least two target exploration objects exist, and distances between the target virtual object and the target exploration objects are different, displaying, on the compass indicator, guidance icons corresponding to the target exploration objects, where display sizes of the guidance icons corresponding to the different target exploration objects are different, and the display size of the guidance icon is in a negative correlation relationship with the corresponding distance (the distance between the target exploration object and the target virtual object).

When at least two target exploration objects exist, the guidance icons corresponding to the target exploration objects are displayed on the compass indicator based on the different distances between the target virtual object and the target exploration objects. The display sizes of the guidance icons corresponding to the target exploration objects are different, and the display size of the guidance icon of each target exploration object is in the negative correlation relationship with the distance between the target exploration object and the target virtual object. For example, a display size of a guidance icon corresponding to a target exploration object that is far away from the target virtual object is small, and a display size of a guidance icon corresponding to a target exploration object that is close to the target virtual object is large. In this way, a player can directly determine, based on the display sizes of the guidance icons, a distance between a corresponding target exploration object and the player, to help the player select a current most proper target exploration object for exploration, thereby helping improve exploration efficiency or human-computer interaction efficiency.

In some embodiments, when the guidance information includes a guidance icon corresponding to the target exploration object, the terminal device may display, in the following manner on the compass indicator, the guidance information corresponding to the target exploration object: when a plurality of target exploration objects exist, and distances between the target virtual object and the target exploration objects are different, determining distance ranges to which the distances between the target virtual object and the target exploration objects belong, and determining, based on the determined distance ranges, guidance icons corresponding to the target exploration objects, where different distance ranges correspond to guidance icons of different styles (for example, different sizes or different color depths).

During actual application, a quantity of distance ranges may be set based on an actual situation. For example, it is set that three distance ranges are included, namely, a first distance range, a second distance range, and a third distance range. A largest value of the first distance range is a smallest value of the second distance range, and a largest value of the second distance range is a smallest value of the third distance range. When the different distance ranges correspond to different color depths, correspondingly, the first distance range, the second distance range, and the third distance range may all correspond to yellow. A color depth of the first distance range is less than a color depth of the second distance range, and the color depth of the second distance range is less than a color depth of the third distance range. In this way, the distances between the target virtual object and the target exploration objects may be indicated by using color depths.

In some embodiments, when the guidance information includes a guidance icon corresponding to the target exploration object, the terminal device may display, in the following manner on the compass indicator, the guidance information corresponding to the target exploration object: when at least two target exploration objects exist, and distances between the target virtual object and the target exploration objects are different, determining, based on the distances, scale factors corresponding to the corresponding target exploration objects; and scaling, based on the scale factors, guidance icons corresponding to the corresponding target exploration objects, and displaying scaled guidance icons on the compass indicator, to enable display sizes of the guidance icons to be consistent.

When at least two target exploration objects exist, and the distances between the target virtual object and the target exploration objects are different, when the guidance icons corresponding to the target exploration objects are displayed on the compass indicator, the corresponding guidance icons are differently scaled according to the different scale factors based on the different distances between the target virtual object and the target exploration objects. The scale factor is in the negative correlation relationship with the distance between the target exploration object and the target virtual object. For example, a scale factor of a guidance icon corresponding to a target exploration object that is far away from the target virtual object is small, and a scale factor of a guidance icon corresponding to a target exploration object that is close to the target virtual object is large, so that the display sizes of the guidance icons corresponding to the target exploration objects are generally consistent, where the distances between the target virtual object and the target exploration objects are different. In this way, the guidance icons with the consistent display sizes on the compass indicator enable a displayed image to be more harmonious.

Because corresponding position indication information may be displayed in associated display areas of the guidance icons, a player may understand relative positions between the target virtual object and the target exploration objects based on the position indication information, and selection of the player for a current most proper target exploration object for exploration is not affected.

In some embodiments, the terminal device may display, in the following manner on the compass indicator, the guidance information corresponding to the target exploration object: when an interest exploration object and a function exploration object are integrated in the target exploration object, displaying, on the compass indicator, first guidance information corresponding to the interest exploration object. Correspondingly, the terminal device may adjust the display style of the guidance information in the following manner: when the target virtual object moves to the interest exploration object, updating the first guidance information displayed on the compass indicator to second guidance information corresponding to the function exploration object.

During actual application, different display styles may be used, based on different categories of target exploration objects, to display corresponding guidance information on the compass indicator. For example, when the target exploration object is a one-time interest exploration object (namely, an interest exploration object, such as a road sign, an attraction, or a crescent bridge), because after a player explores an exploration object of this category, the exploration object of this category has no repeated exploration value, or guidance information of the exploration object of this category is displayed in a world map of the virtual scene, the guidance information of the exploration object of this category no longer needs to be displayed on the compass indicator. For another example, when the target exploration object is an exploration object of a function category (namely, a function exploration object, such as a virtual item store), provided that a corresponding detection distance is satisfied, guidance information corresponding to the exploration object of this category may be displayed on the compass indicator. When the target exploration object is a combination of an interest exploration object and a function exploration object, in other words, both the interest exploration object and the function exploration object exist at a same exploration position, for example, there is a monster (the function exploration object) on a small mountain (the interest exploration object), because the function exploration object (such as the monster) is fixedly spawned after being killed, before a player explores the interest exploration object (such as the small mountain), first guidance information (such as an indication icon displaying the small mountain) corresponding to the interest exploration object (such as the small mountain) is displayed on the compass indicator, to indicate the player that there is an explorable interest exploration object (such as the small mountain) nearby. After the player reaches the interest exploration object (such as the small mountain), second guidance information (such as an indication icon displaying the monster) corresponding to the function exploration object (such as the monster) is displayed on the compass indicator, to indicate the player that there is an explorable function exploration object (such as the monster) nearby. In this way, when the player is effectively guided to explore the function exploration object, exploration interest of the player is attracted by using the interest exploration object, so that game experience is improved.

The following describes an example application of this embodiment of this disclosure in an actual application scene.

Using an example in which a virtual scene is a game, an embodiment of this disclosure provides a method for guiding movement of a virtual object. In the game, corresponding guidance information is displayed on a compass indicator in different display manners based on different categories of target exploration objects. Details are described one by one below.

1. Detection Distances Corresponding to the Exploration Objects of Different Categories are Different.

Different detection distances (including a horizontal detection distance and a vertical detection distance) are set for corresponding exploration objects based on different functions carried by exploration positions (namely, positions of the exploration objects), so that guidance is clearer. For example, when the exploration object is a teleportation point with a teleportation function (for example, teleporting a target virtual object from one side of a game image to the other side), a player expects to be able to see the exploration object from a large distance. Therefore, a detection distance corresponding to the exploration object is large. For another example, when the exploration object is a virtual item that can be picked up, only when the exploration object is located near a target virtual object, a player can have an opportunity to pick up the exploration object. Therefore, a detection distance corresponding to the exploration object is small. Only guidance information corresponding to an exploration object that satisfies a detection distance is displayed on the compass indicator. Different detection distances are set for exploration objects of different categories, so that a quantity of pieces of guidance information displayed on the compass indicator can be effectively controlled (that is, a quantity and types of displayed exploration objects are reduced). Therefore, the guidance information displayed on the compass indicator is more appropriate, and the guidance information displayed on the compass indicator is not excessively much or little. When effectiveness and flexibility of guidance are improved, a display resource is not wasted.

2. Determining is Performed Based on a Distance Between an Exploration Object and a Target Virtual Object.

A far guidance icon displayed on the compass indicator is small and a close guidance icon displayed on the compass indicator is large, to enable a player to intuitively understand a distance between an exploration object and the target virtual object. To be specific, when a guidance icon is smaller, a distance between a corresponding exploration object and the target virtual object is larger, and when a guidance icon is larger, a distance between a corresponding exploration object and the target virtual object is small. For example, during actual implementation, display sizes of indication icons corresponding to exploration objects may be divided into a plurality of levels based on an actual requirement and based on distances between the target virtual object and the exploration objects. In this way, because a guidance icon far away from the player is small and a guidance icon close to the player is large, a distance relationship between the player and each exploration object on the compass indicator can be intuitively established, to help the player select a current most proper target exploration object for exploration, thereby further helping improve exploration efficiency.

In addition, during actual application, to avoid an unsightly interface caused by guidance icons that are of different sizes and that are displayed on the compass indicator, scale factors corresponding to corresponding exploration objects may be determined based on distances between the target virtual object and the exploration objects, guidance icons corresponding to the corresponding exploration objects are scaled based on the scale factors, and scaled guidance icons are displayed on the compass indicator, so that display sizes of the guidance icons are generally consistent. In addition, for different exploration object that has a same distance to the target virtual object, because styles of guidance icons corresponding to the different exploration objects are different, display sizes of the guidance icons corresponding to the different exploration objects may be different. In this case, scale factors corresponding to the corresponding exploration objects may be determined based on the styles of the guidance icons of the exploration objects, the guidance icons corresponding to the corresponding exploration objects are scaled based on the scale factors, and scaled guidance icons are displayed on the compass indicator, so that the display sizes of the guidance icons of the exploration objects that are in a same distance range with the target virtual object are generally consistent. In this way, the guidance icons with the consistent display sizes on the compass indicator enable a displayed image to be more harmonious. Because corresponding position indication information may be displayed in associated display areas of the guidance icons, a player may understand relative positions between the target virtual object and the target exploration objects based on the position indication information, and selection of the player for a current most proper target exploration object for exploration is not affected.

3. A Relationship Between an Exploration Object and a Target Virtual Object in a Vertical Height.

Figure 9:
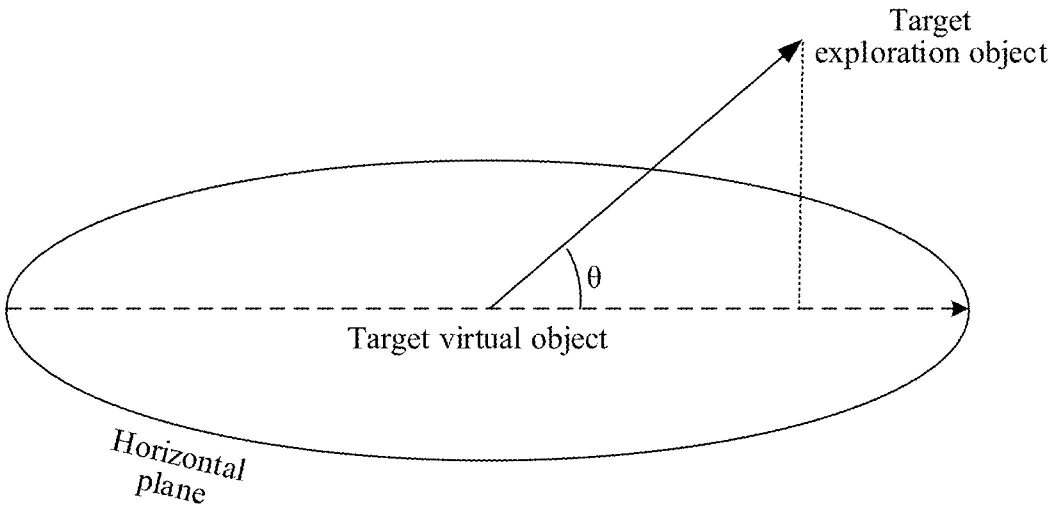
FIG. 9 is a schematic diagram of a height difference according to an embodiment of this disclosure.

FIG. 9 is a schematic diagram of a height difference according to an embodiment of this disclosure. When the target exploration object and the target virtual object are not located on a same horizontal line, in other words, when an angle between a connection line between the target virtual object and the target exploration object and a horizontal line on which the target virtual object is located is not 0 degrees or 180 degrees, a vertical height difference between the target exploration object and the target virtual object is a height difference between the target exploration object and the target virtual object, and the height difference is represented by using a corresponding height difference mark based on a height difference value. For example, when the height difference is greater than 0, a height of the target exploration object is greater than a height of the target virtual object, and a positive triangle is used for representation in this case. When the height difference is less than 0, the height of the target exploration object is less than the height of the target virtual object, and an inverted triangle is used for representation in this case.

4. Application of Displaying Exploration Objects of Different Categories on the Compass Indicator.

Corresponding guidance information may be displayed on the compass indicator by using different display styles based on different categories of target exploration objects. For example, when the target exploration object is a one-time interest exploration object (namely, an interest exploration object, such as a road sign, an attraction, or a crescent bridge), because after a player explores an exploration object of this category, the exploration object of this category has no repeated exploration value, or guidance information of the exploration object of this category is displayed in a world map of the virtual scene, the guidance information of the exploration object of this category no longer needs to be displayed on the compass indicator.

For another example, when the target exploration object is an exploration object of a function category (namely, a function exploration object, such as a virtual item store), provided that a corresponding detection distance is satisfied, guidance information corresponding to the exploration object of this category may be displayed on the compass indicator. When the target exploration object is a combination of an interest exploration object and a function exploration object, in other words, both the interest exploration object and the function exploration object exist at a same exploration position, for example, there is a monster (the function exploration object) on a small mountain (the interest exploration object), because the function exploration object (such as the monster) is fixedly spawned after being killed, before a player explores the interest exploration object (such as the small mountain), first guidance information (such as an indication icon displaying the small mountain) corresponding to the interest exploration object (such as the small mountain) is displayed on the compass indicator, to indicate the player that there is an explorable interest exploration object (such as the small mountain) nearby. After the player reaches the interest exploration object (such as the small mountain), second guidance information (such as an indication icon displaying the monster) corresponding to the function exploration object (such as the monster) is displayed on the compass indicator, to indicate the player that there is an explorable function exploration object (such as the monster) nearby. In this way, when the player is effectively guided to explore the function exploration object, exploration interest of the player is attracted by using the interest exploration object, so that game experience is improved.

For another example, when the target exploration object is a tracing exploration object (an object traced by the target virtual object), a relative position between the target exploration object and the target virtual object may be ignored, and guidance information of the target exploration object is controlled to be constantly displayed at both ends of the compass indicator and in a prominent manner (for example, by using a flashing special effect). In this way, the target virtual object can be effectively guided to move to the traced exploration object, so that the target exploration object can be traced as soon as possible, thereby improving tracing efficiency or human-computer interaction efficiency.

For another example, when the target exploration object is a tracing task object (a to-be-executed task), when the target exploration object is far away from the target virtual object, a guidance icon of the target exploration object is constantly displayed on the compass indicator, and position indication information (such as a distance between the target exploration object and the target virtual object) is displayed in an associated display area (such as a position below the icon) of the guidance icon. When the target exploration object is close to the target virtual object, because a player can see the target exploration object, in this case, the guidance icon of the target exploration object may be directly displayed in a game scene, the position indication information (such as the distance between the target exploration object and the target virtual object) is displayed in the associated display area (such as the position below the icon) of the guidance icon in the game scene, and a special effect (such as a light beam) is used in the game scene to display guidance. For example, when the distance between the target virtual object and the target exploration object is greater than a first distance threshold (which may be set, for example, set to 60 meters), the guidance information corresponding to the target exploration object is displayed on the compass indicator. When the distance between the target virtual object and the target exploration object is less than a second distance threshold (which may be set, for example, set to 70 meters), the corresponding guidance information is displayed at an exploration position at which the target exploration object is located in the game scene. When the distance between the target virtual object and the target exploration object is greater than the first distance threshold and less than the second distance threshold (that is, from 60 meters to 70 meters), not only the guidance information corresponding to the target exploration object is displayed on the compass indicator, but also corresponding guidance information (such as a light beam reminder) is displayed at the exploration position at which the target exploration object is located in the game scene. That is, reminders are displayed both on the compass indicator and in the scene, so that transition is more natural and a jumping feeling of guidance is weakened.

Figure 10:
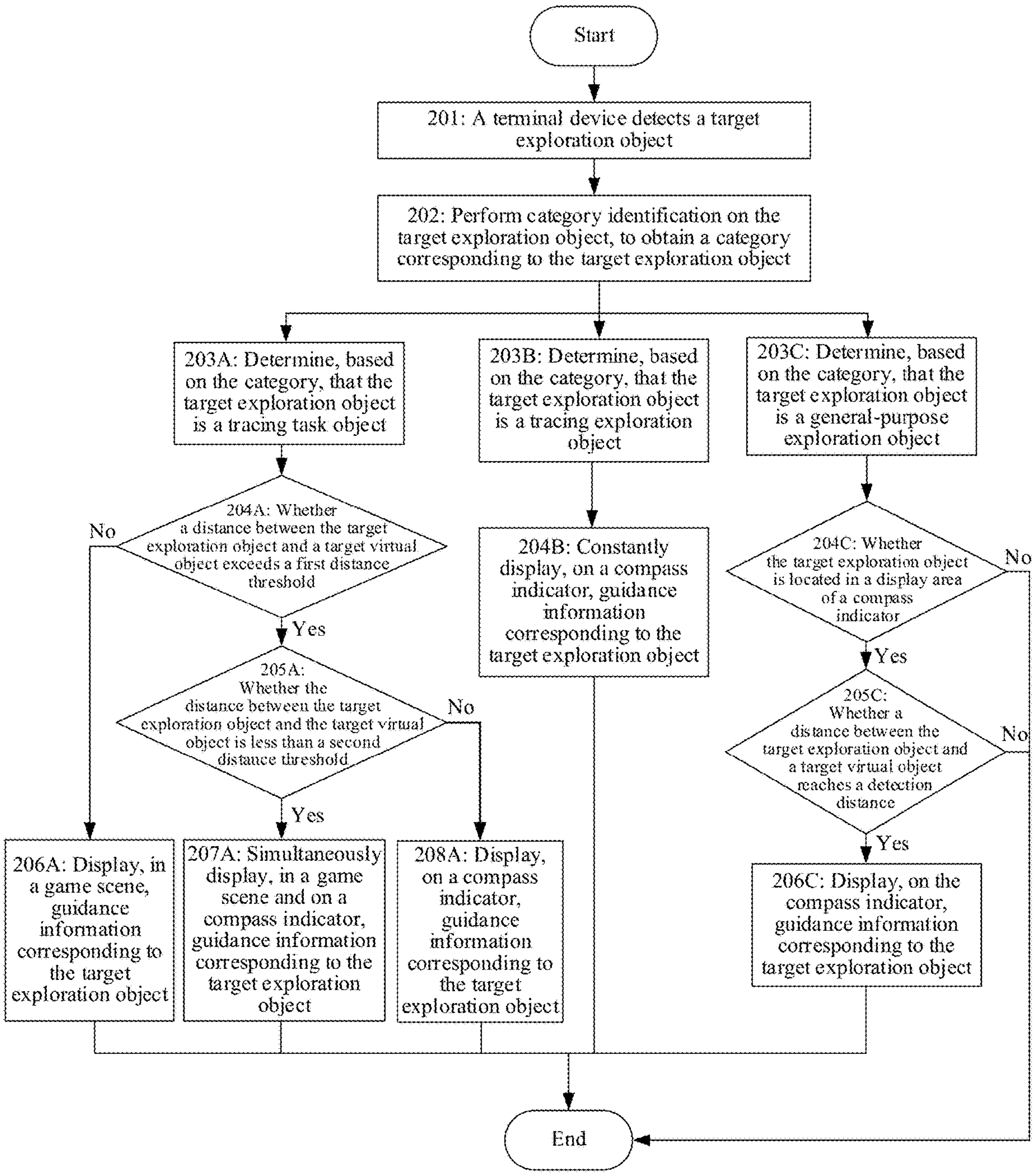
FIG. 10 is a schematic flowchart of a method for guiding movement of a virtual object according to an embodiment of this disclosure.

In addition to the tracing exploration object and the tracing task object, an exploration object of another category, such as the exploration object of the function category and the exploration object of the interest category, are collectively referred to as general-purpose exploration objects. Next, FIG. 10 is a schematic flowchart of a method for guiding movement of a virtual object according to an embodiment of this disclosure. The method for guiding movement of a virtual object provided in this embodiment of this disclosure continues to be described.

Operation 201: A terminal device detects a target exploration object.

Operation 202: Perform category identification on the target exploration object, to obtain a category corresponding to the target exploration object.

Operation 203A: Determine, based on the category, that the target exploration object is a tracing task object.

Operation 204A: Determine whether a distance between the target exploration object and a target virtual object exceeds a first distance threshold.

When it is determined that the distance between the target exploration object and the target virtual object exceeds the first distance threshold, an operation 205A is performed. When it is determined that the distance between the target exploration object and the target virtual object does not exceed the first distance threshold, an operation 206A is performed.

Operation 205A: Determine whether the distance between the target exploration object and the target virtual object is less than a second distance threshold.

When it is determined that the distance between the target exploration object and the target virtual object is less than the second distance threshold, an operation 207A is performed. When it is determined that the distance between the target exploration object and the target virtual object is not less than the second distance threshold, an operation 208A is performed.

Operation 206A: Display, in a game scene, guidance information corresponding to the target exploration object.

Operation 207A: Simultaneously display, in a game scene and on a compass indicator, guidance information corresponding to the target exploration object.

Operation 208A: Display, on a compass indicator, guidance information corresponding to the target exploration object.

Operation 203B: Determine, based on the category, that the target exploration object is a tracing exploration object.

Operation 204B: Constantly display, on a compass indicator, guidance information corresponding to the target exploration object.

Operation 203C: Determine, based on the category, that the target exploration object is a general-purpose exploration object.

Operation 204C: Determine whether the target exploration object is located in a display area of a compass indicator.

A target area (such as a sector area) in which a position at which a target virtual object is located is a circle center and a target angle is an angle (which can be set, for example, set to 100 degrees) along a direction of the target virtual object in the game scene is used as the display area of the compass indicator. When a distance between an exploration object in the display area and the target virtual object satisfies a detection distance, guidance information corresponding to the exploration object may be displayed on the compass indicator. Therefore, when the target exploration object is in the display area of the compass indicator, an operation 205C is performed. Otherwise, the procedure ends.

Operation 205C: Determine whether a distance between the target exploration object and a target virtual object reaches a detection distance.

When the distance between the target exploration object and the target virtual object reaches the detection distance, an operation 206C is performed. Otherwise, the procedure ends.

Operation 206C: Display, on the compass indicator, guidance information corresponding to the target exploration object.

The guidance information involved in the foregoing operations may include at least one of the guidance icon and the position indication information that correspond to the target exploration object. When both the guidance icon and the position indication information are included, the guidance icon in the guidance information is displayed, and the position indication information is displayed in the associated display area of the guidance icon. The guidance icon is an identifier (such as a picture identifier or a text identifier) configured for indicating the target exploration object. For example, when the target exploration object is a "mountain", a corresponding guidance icon may be a picture identifier indicating a shape of the mountain or a text identifier (such as a mountain) of the mountain. The position indication information is configured for indicating the distance (such as a linear distance, a horizontal distance, or a vertical distance) between the target exploration object and the target virtual object or the height difference (where when the target exploration object and the target virtual object are not located on a same horizontal line, the height difference may be represented by using a height difference mark, for example, a positive triangle indicates that a height of the target exploration object is greater than a height of the target virtual object, and an inverted triangle indicates that the height of the target exploration object is less than the height of the target virtual object) between the target exploration object and the target virtual object.

Then, a player may dynamically adjust the display style of the guidance information as the relative position between the target exploration object and the target virtual object changes in a process in which the target virtual object is guided, based on the guidance information, to move to the target exploration object, so that the display style adapts to the relative position between the target exploration object and the target virtual object.

In the foregoing manner, because the compass indicator may be an indicator bar with transparency, the compass indicator occupies a low proportion of a game image in comparison with a mini map. Therefore, when the guidance information of the target exploration object is displayed on the compass indicator, the game image is more concise and beautiful. In the process in which the target virtual object is guided, based on the guidance information, to move to the target exploration object, the display style of the guidance information is dynamically adjusted as the relative position between the target exploration object and the target virtual object changes, so that the display style matches the relative position between the target exploration object and the target virtual object, the display style of the guidance information is enriched, and utilization of a graphics processing resource is improved. In addition, the dynamically adjusted display style can better guide movement of the target virtual object, and help improve an exploration capability of the target virtual object in the virtual scene, thereby improving exploration efficiency or human-computer interaction efficiency.

The following continues to describe an example structure in which an implementation of the apparatus 465 for guiding movement of a virtual object provided in an embodiment of this disclosure is a software module. In some embodiments, the software module in the apparatus 465 that is for guiding movement of a virtual object and that is stored in the memory 460 in FIG. 3 may include a first display module 4651, a second display module 4652, and a style adjustment module 4653.

The first display module 4651 is configured for displaying a target virtual object and a compass indicator in an image of a virtual scene. The second display module 4652 is configured for: when a target exploration object exists in the virtual scene, and a distance between the target exploration object and the target virtual object exceeds a first distance, displaying, on the compass indicator, guidance information corresponding to the target exploration object, where the guidance information is configured for guiding the target virtual object to move in the virtual scene. The style adjustment module 4653 is configured for dynamically adjusting a display style of the guidance information in a movement process of the target virtual object, where an adjusted display style adapts to a relative position between the target exploration object and the target virtual object.

In some embodiments, before displaying, on the compass indicator, the guidance information corresponding to the target exploration object, the apparatus further includes: a distance determining module, configured for performing category identification on the target exploration object, to obtain a category corresponding to the target exploration object; and determining, based on the category of the target exploration object, the first distance corresponding to the target exploration object.

In some embodiments, the second display module is further configured for: when the guidance information includes a guidance icon and position indication information that correspond to the target exploration object, displaying the guidance icon on the compass indicator, and displaying the position indication information in an associated display area of the guidance icon, where the position indication information is configured for indicating at least one of the following position information: a distance between the target exploration object and the target virtual object, or a height difference between the target exploration object and the target virtual object.

In some embodiments, the style adjustment module is further configured for: as the relative position between the target exploration object and the target virtual object changes, correspondingly adjusting a display size of the guidance icon, to enable the display size of the guidance icon to match the relative position; and updating the position information indicated by the position indication information, to enable the position information indicated by the position indication information to be consistent with the relative position.

In some embodiments, the apparatus further includes a third display module, configured for: in a process of correspondingly adjusting the display size of the guidance icon, displaying, in the associated display area of the guidance icon, a special effect element corresponding to the guidance icon, where the special effect element is configured for indicating that the distance between the target exploration object and the target virtual object is less than a second distance, where the second distance is less than the first distance.

In some embodiments, when the position information indicated by the position indication information includes the height difference, the apparatus further includes: a first determining module, configured for obtaining a first connection line between the target virtual object and the target exploration object, and obtaining a first angle between the first connection line and a horizontal line on which the target virtual object is located; and determining the height difference between the target exploration object and the target virtual object based on the first angle.

In some embodiments, when the guidance information includes a guidance icon corresponding to the target exploration object, the second display module is further configured for: when at least two target exploration objects exist, and distances between the target virtual object and the target exploration objects are different, displaying, on the compass indicator, guidance icons corresponding to the target exploration objects, where display sizes of the guidance icons corresponding to the different target exploration objects are different, and the display size of the guidance icon is in a negative correlation relationship with the corresponding distance.

In some embodiments, when the guidance information includes a guidance icon corresponding to the target exploration object, the second display module is further configured for: when at least two target exploration objects exist, and distances between the target virtual object and the target exploration objects are different, determining, based on the distances, scale factors corresponding to the corresponding target exploration objects; and scaling, based on the scale factors, guidance icons corresponding to the corresponding target exploration objects, and displaying scaled guidance icons on the compass indicator, to enable display sizes of the guidance icons to be consistent.

In some embodiments, the second display module is further configured for: when an interest exploration object and a function exploration object are integrated in the target exploration object, displaying, on the compass indicator, first guidance information corresponding to the interest exploration object. The style adjustment module is further configured for: when the target virtual object moves to the interest exploration object, updating the first guidance information displayed on the compass indicator to second guidance information corresponding to the function exploration object.

In some embodiments, the second display module is further configured for: when an indication graduation is distributed on the compass indicator, obtaining a first relative position between the target exploration object and the target virtual object, and obtaining a first mapping relationship, where the first mapping relationship is configured for indicating a mapping relationship between a second relative position and the indication graduation on the compass indicator, and the second relative position is a relative position between an exploration object and a virtual object in the virtual scene; and determining, based on the first mapping relationship, a first target indication graduation corresponding to the first relative position on the compass indicator, and displaying, at the first target indication graduation on the compass indicator, the guidance information corresponding to the target exploration object.

In some embodiments, the second display module is further configured for: obtaining a target area in which a position at which the target virtual object is located is a circle center and a second angle is a target angle, and using the target area as a display area of the compass indicator, where a straight line on which a direction of the target virtual object is located is an angle bisector of the second angle; and when the target exploration object exists in the display area in the virtual scene, and the distance between the target exploration object and the target virtual object exceeds the first distance, displaying, on the compass indicator, the guidance information corresponding to the target exploration object.

In some embodiments, the second display module is further configured for: when an indication graduation is distributed on the compass indicator, obtaining a third angle corresponding to the target exploration object, and a second mapping relationship between a fourth angle corresponding to an exploration object in the display area and the indication graduation on the compass indicator, where the third angle is an angle between a second connection line and the angle bisector of the second angle, the second connection line is a connection line between the target exploration object and the target virtual object, the fourth angle is an angle between a third connection line and an angle bisector corresponding to a virtual object, and the third connection line is a connection line between the exploration object and the virtual object in the virtual scene; and determining, based on the second mapping relationship, a second target indication graduation corresponding to the third angle on the compass indicator, and displaying, at the second target indication graduation on the compass indicator, the guidance information corresponding to the target exploration object.

In some embodiments, when another exploration object exists on the second connection line, the second display module is further configured for: displaying, in a scrolling manner at the second target indication graduation on the compass indicator, the guidance information corresponding to the target exploration object and guidance information corresponding to the another exploration object; displaying, in parallel on a vertical line on which the second target indication graduation on the compass indicator is located, the guidance information corresponding to the target exploration object and guidance information corresponding to the another exploration object; or displaying, in a superposition manner at the second target indication graduation on the compass indicator and by using display styles of different visibilities, the guidance information corresponding to the target exploration object and guidance information corresponding to the another exploration object, where the visibility is in positive correlation with exploration priorities of the target exploration object and the another exploration object.

In some embodiments, the apparatus further includes a fourth display module, configured for: when the target exploration object exists in an area other than the display area in the virtual scene, and the target exploration object is a tracing exploration object, displaying, in a prominent manner at an endpoint position on the compass indicator, the guidance information corresponding to the target exploration object.

In some embodiments, the apparatus further includes a display canceling module, configured for: when the target exploration object is an interest exploration object or a function exploration object, and the target virtual object moves to the target exploration object, canceling displaying, on the compass indicator, the guidance information corresponding to the target exploration object.

In some embodiments, the apparatus further includes a fifth display module, configured for: when the distance between the target exploration object and the target virtual object does not exceed the first distance, displaying, in the virtual scene, the guidance information corresponding to the target exploration object, and displaying the target exploration object in a prominent manner; or when the distance between the target exploration object and the target virtual object exceeds the first distance and does not exceed a third distance, displaying, in a process of displaying the guidance information on the compass indicator, the target exploration object in the virtual scene in a prominent manner, where the third distance is greater than the first distance, and the prominent manner includes at least one of the following display manners: target color displaying, overlaying and masking displaying, highlighting displaying, strobing displaying, and special effect displaying.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

An embodiment of this disclosure provides a computer program product. The computer program product includes a computer program or computer-executable instructions. The computer program or the computer-executable instructions are stored in a computer-readable storage medium. A processor of an electronic device reads the computer-executable instructions from the computer-readable storage medium, and executes the computer-executable instructions, to enable the electronic device to perform the method for guiding movement of a virtual object in the foregoing embodiment of this disclosure.

An embodiment of this disclosure provides a computer-readable storage medium, such as a non-transitory computer-readable storage medium, having computer-executable instructions stored therein. When the computer-executable instructions are executed by a processor, the processor is enabled to perform the method for guiding movement of a virtual object in the foregoing embodiment of this disclosure, for example, the method shown in FIG. 4.

In some embodiments, the computer-readable storage medium may be a memory such as a read-only memory (ROM), a random access memory (RAM), an erasable programmable read-only memory (EPROM), an electrically erasable programmable read-only memory (EEPROM), a flash memory, a magnetic surface memory, an optical disk, or a CD-ROM, or may include various devices of one or any combination of the foregoing memories.

In some embodiments, the computer-executable instructions may be in a form of a program, software, a software module, a script, or code, written in a programming language of any form (including a compiled or interpreted language, or a declarative or procedural language), and may be deployed in any form, including being deployed as a stand-alone program or as a module, a component, a subroutine, or another unit suitable for use in a computing environment.

In an example, the computer-executable instructions may, but do not necessarily correspond to, a file in a file system, and may be stored as a part of a file having another program or data stored therein. For example, the computer-executable instructions are stored in one or more scripts in a hypertext markup language (HTML) text, stored in a single file dedicated to a discussed program, or stored in a plurality of collaborative files (for example, files having one or more modules, subprograms, or code parts).

In an example, the computer-executable instructions may be deployed on an electronic device for execution, or may be executed on a plurality of electronic devices located at a same position. Alternatively, the computer-executable instructions are executed on a plurality of electronic devices that are connected through a communication network and that are distributed at a plurality of position.

The foregoing descriptions are merely examples of embodiments of this disclosure, and are not intended to limit the scope of this disclosure. Any modification, equivalent replacement, and improvement made within the spirit and scope of this disclosure are included in the scope of this disclosure.

What is claimed is:

1. A method for guiding movement of a virtual object in a virtual environment, the method comprising:
 displaying a guidance indicator for guiding the movement of the virtual object in the virtual environment;
 when a distance between a first game asset and the virtual object in the virtual environment is less than or equal to a first distance threshold associated with the first game asset, displaying, on the guidance indicator, guidance information corresponding to the first game asset based on a relative position of the first game asset to the virtual object, the guidance information including position indication information indicating an elevation difference between the first game asset and the virtual object; and
 adjusting a display attribute of the guidance information based on a change in the relative position of the first game asset to the virtual object.

2. The method according to claim 1, further comprising:
 determining a category of the first game asset; and
 determining, based on the category of the first game asset, the first distance threshold corresponding to the first game asset from a plurality of distances associated with different game asset categories.

3. The method according to claim 1, wherein
 the guidance indicator includes a horizontal indicator bar, and
 a position of the guidance information on the horizontal indicator bar indicates the relative position of the first game asset to the virtual object.

4. The method according to claim 1, wherein
 the displaying, on the guidance indicator, the guidance information comprises:
 displaying a guidance icon corresponding to the first game asset on the guidance indicator; and
 displaying the position indication information corresponding to the first game asset in association with the guidance icon.

5. The method according to claim 4, wherein
 the position indication information further indicates a distance between the first game asset and the virtual object, and
 the adjusting the display attribute of the guidance information includes:
 as the relative position of the first game asset to the virtual object changes, adjusting a display size of the guidance icon based on the change in the relative position.

6. The method according to claim 5, further comprising:
 when the distance between the first game asset and the virtual object is less than a second distance threshold, displaying, in an associated display area of the guidance icon, a special effect element corresponding to the guidance icon while the display size of the guidance icon is adjusted, wherein
 the special effect element indicates that the distance between the first game asset and the virtual object is less than the second distance threshold, the second distance threshold being less than the first distance threshold.

7. The method according to claim 1, further comprising:
 obtaining a first connection line between the virtual object and the first game asset;
 obtaining a first angle between the first connection line and a horizontal line on which the virtual object is located; and
 determining the elevation difference between the first game asset and the virtual object based on the first angle.

8. The method according to claim 1, wherein
 the displaying, on the guidance indicator, the guidance information includes, when distances between the virtual object and a plurality of game assets are different, displaying, on the guidance indicator, guidance icons corresponding to the plurality of game assets, the plurality of game assets including the first game asset,
 display sizes of the guidance icons corresponding to the plurality of game assets are different, and
 the display sizes of the guidance icons being negatively correlated with the corresponding distances between the virtual object and the plurality of game assets.

9. The method according to claim 1, wherein
 the adjusting the display attribute of the guidance information includes:
 when distances between the virtual object and a plurality of game assets are different, determining, based on the distances, scale factors corresponding to the plurality of game assets, the plurality of game assets including the first game asset; and
 scaling, based on the scale factors, guidance icons corresponding to the plurality of game assets, and the displaying, on the guidance indicator, the guidance information includes:

displaying the scaled guidance icons on the guidance indicator.

10. The method according to claim 1, wherein the displaying, on the guidance indicator, the guidance information includes displaying, on the guidance indicator, the guidance information corresponding to a first game asset; and the adjusting the display attribute of the guidance information includes, when the virtual object moves to the first game asset, replacing the guidance information displayed on the guidance indicator with guidance information corresponding to a second game asset.

11. The method according to claim 1, wherein the displaying, on the guidance indicator, the guidance information comprises:

obtaining a first relative position between the first game asset and the virtual object;

obtaining a first mapping relationship between a second relative position and an indication graduation on the guidance indicator, the second relative position being between the a second game asset in the virtual environment and the virtual object;

determining, based on the first mapping relationship, a first target indication graduation corresponding to the first relative position on the guidance indicator; and displaying, at the first target indication graduation on the guidance indicator, the guidance information corresponding to the first game asset.

12. The method according to claim 1, wherein the displaying, on the guidance indicator, the guidance information comprises:

displaying, on the guidance indicator, the guidance information corresponding to the first game asset at a position on the guidance indicator that is mapped to a directional angle of the first game asset relative to a forward facing direction of the virtual object.

13. The method according to claim 1, further comprising:

when the virtual object moves to the first game asset, canceling the displaying, on the guidance indicator, of the guidance information corresponding to the first game asset.

14. The method according to claim 1, further comprising:

when the distance between the first game asset and the virtual object is greater than the first distance threshold and is less than or equal to a third distance threshold that is greater than the first distance threshold, displaying the guidance information corresponding to the first game asset with at least one of a target color, highlighting, strobing, or a special effect.

15. An information processing apparatus, comprising:

processing circuitry configured to:

display a guidance indicator for guiding movement of a virtual object in a virtual environment;

when a distance between a first game asset and the virtual object in the virtual environment is less than or equal to a first distance threshold associated with the first game asset, display, on the guidance indicator, guidance information corresponding to the first game asset based on a relative position of the first game asset to the virtual object, the guidance information including position indication information indicating an elevation difference between the first game asset and the virtual object; and adjust a display attribute of the guidance information based on a change in the relative position of the first game asset to the virtual object.

16. The information processing apparatus according to claim 15, wherein the processing circuitry is configured to:

determine a category of the first game asset; and determine, based on the category of the first game asset, the first distance threshold corresponding to the first game asset from a plurality of distances associated with different game asset categories.

17. The information processing apparatus according to claim 15, wherein the guidance indicator includes a horizontal indicator bar, and a position of the guidance information on the horizontal indicator bar indicates the relative position of the first game asset to the virtual object.

18. The information processing apparatus according to claim 15, wherein the processing circuitry is configured to:

display a guidance icon corresponding to the first game asset on the guidance indicator; and display the position indication information corresponding to the first game asset in association with the guidance icon.

19. The information processing apparatus according to claim 18, wherein the position indication information further indicates a distance between the first game asset and the virtual object, and the processing circuitry is configured to:

as the relative position of the first game asset to the virtual object changes, adjust a display size of the guidance icon based on the change in the relative position.

20. A non-transitory computer-readable storage medium storing instructions which, when executed by a processor, cause the processor to perform:

displaying a guidance indicator for guiding movement of a virtual object in a virtual environment;

when a distance between a first game asset and the virtual object in the virtual environment is less than or equal to a first distance threshold associated with the first game asset, displaying, on the guidance indicator, guidance information corresponding to the first game asset based on a relative position of the first game asset to the virtual object, the guidance information including position indication information indicating an elevation difference between the first game asset and the virtual object; and adjusting a display attribute of the guidance information based on a change in the relative position of the first game asset to the virtual object.

* * * * *